(12) United States Patent
Leyvand et al.

(10) Patent No.: US 8,861,839 B2
(45) Date of Patent: *Oct. 14, 2014

(54) HUMAN TRACKING SYSTEM

(71) Applicant: Microsoft Corporation, Redmond, WA (US)

(72) Inventors: Tommer Leyvand, Seattle, WA (US); Johnny Chung Lee, Mountain View, CA (US); Szymon Stachniak, Kirkland, WA (US); Craig Peeper, Kirkland, WA (US); Shao Liu, Urbana, IL (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/034,484

(22) Filed: Sep. 23, 2013

(65) Prior Publication Data

US 2014/0022161 A1    Jan. 23, 2014

Related U.S. Application Data

(63) Continuation of application No. 13/365,121, filed on Feb. 2, 2012, now Pat. No. 8,542,910, which is a continuation of application No. 12/575,388, filed on Oct. 7, 2009, now Pat. No. 8,564,534.

(51) Int. Cl.
*G06K 9/00* (2006.01)
*A63F 13/20* (2014.01)
*A63F 13/40* (2014.01)
*G06F 3/01* (2006.01)
*G06T 7/00* (2006.01)

(52) U.S. Cl.
CPC ..... *G06K 9/00362* (2013.01); *A63F 2300/1075* (2013.01); *A63F 13/06* (2013.01); *G06T 2207/10028* (2013.01); *A63F 2300/6045* (2013.01); *G06T 2207/20144* (2013.01); *G06T 2207/30196* (2013.01); *A63F 13/10* (2013.01); *G06F 3/017* (2013.01); *G06T 7/0046* (2013.01)
USPC ............................. 382/154; 382/103; 382/106

(58) Field of Classification Search
CPC ..... G06F 3/03; G06K 2209/21; H04N 5/2226
USPC ........................ 382/103, 106, 154; 348/155
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

"Virtual High Anxiety", Tech Update, Aug. 1995, pp. 22.

(Continued)

*Primary Examiner* — Aaron W Carter
(74) *Attorney, Agent, or Firm* — Gregg Wisdom; Judy Yee; Micky Minhas

(57) ABSTRACT

An image such as a depth image of a scene may be received, observed, or captured by a device. A grid of voxels may then be generated based on the depth image such that the depth image may be downsampled. A background included in the grid of voxels may also be removed to isolate one or more voxels associated with a foreground object such as a human target. A location or position of one or more extremities of the isolated human target may be determined and a model may be adjusted based on the location or position of the one or more extremities.

20 Claims, 16 Drawing Sheets

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,561,745 A | 10/1996 | Jackson et al. |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,792,147 A | 8/1998 | Evans et al. |
| 5,844,241 A | 12/1998 | Liu et al. |
| 5,875,108 A | 2/1999 | Hoffberg et al. |
| 5,877,803 A | 3/1999 | Wee et al. |
| 5,909,218 A | 6/1999 | Naka et al. |
| 5,913,727 A | 6/1999 | Ahdoot |
| 5,933,125 A | 8/1999 | Fernie |
| 5,974,175 A | 10/1999 | Suzuki |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,163,336 A | 12/2000 | Richards |
| 6,173,066 B1 | 1/2001 | Peurach et al. |
| 6,181,343 B1 | 1/2001 | Lyons |
| 6,188,777 B1 | 2/2001 | Darrell et al. |
| 6,191,773 B1 | 2/2001 | Maruno et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,272,231 B1 | 8/2001 | Maurer et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,400,368 B1 | 6/2002 | Laperriere |
| 6,411,744 B1 | 6/2002 | Edwards |
| 6,430,997 B1 | 8/2002 | French et al. |
| 6,476,834 B1 | 11/2002 | Doval et al. |
| 6,487,304 B1 | 11/2002 | Szeliski |
| 6,496,598 B1 | 12/2002 | Harman |
| 6,503,195 B1 | 1/2003 | Keller et al. |
| 6,539,931 B2 | 4/2003 | Trajkovic et al. |
| 6,556,199 B1 | 4/2003 | Fang et al. |
| 6,570,555 B1 | 5/2003 | Prevost et al. |
| 6,573,912 B1 | 6/2003 | Suzuki et al. |
| 6,633,294 B1 | 10/2003 | Rosenthal et al. |
| 6,640,202 B1 | 10/2003 | Dietz et al. |
| 6,658,136 B1 | 12/2003 | Brumitt |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,700,586 B1 | 3/2004 | Demers |
| 6,704,433 B2 | 3/2004 | Matsuo et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,864,903 B2 | 3/2005 | Suzuki |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 6,980,690 B1 | 12/2005 | Taylor et al. |
| 7,003,134 B1 | 2/2006 | Covell et al. |
| 7,035,436 B2 | 4/2006 | Nakamura et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,194,122 B2 | 3/2007 | Faber et al. |
| 7,202,898 B1 | 4/2007 | Braun et al. |
| 7,222,078 B2 | 5/2007 | Abelow |
| 7,227,526 B2 | 6/2007 | Hildreth et al. |
| 7,233,327 B2 | 6/2007 | Isner |
| 7,239,718 B2 | 7/2007 | Park et al. |
| 7,257,237 B1 | 8/2007 | Luck et al. |
| 7,259,747 B2 | 8/2007 | Bell |
| 7,274,800 B2 | 9/2007 | Nefian et al. |
| 7,308,112 B2 | 12/2007 | Fujimura et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |

(56) References Cited

U.S. PATENT DOCUMENTS

| | | | |
|---|---|---|---|
| 7,372,977 B2 | 5/2008 | Fujimura et al. | |
| 7,375,728 B2 | 5/2008 | Donath et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,806,589 B2 | 10/2010 | Tashman et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 7,961,910 B2 * | 6/2011 | Lee et al. | 382/103 |
| 8,023,726 B2 | 9/2011 | Sundaresan et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,059,153 B1 | 11/2011 | Barreto et al. | |
| 8,072,470 B2 | 12/2011 | Marks | |
| 8,154,590 B2 | 4/2012 | Kressel et al. | |
| 8,175,335 B2 | 5/2012 | Zhang et al. | |
| 8,249,334 B2 | 8/2012 | Berliner et al. | |
| 8,325,984 B2 | 12/2012 | Lee et al. | |
| 8,483,436 B2 * | 7/2013 | Lee et al. | 382/103 |
| 8,542,910 B2 * | 9/2013 | Leyvand et al. | 382/154 |
| 8,564,534 B2 * | 10/2013 | Leyvand et al. | 345/156 |
| 2002/0158873 A1 | 10/2002 | Williamson | |
| 2003/0052878 A1 * | 3/2003 | Han et al. | 345/420 |
| 2003/0068075 A1 | 4/2003 | Faber et al. | |
| 2003/0113018 A1 | 6/2003 | Nefian et al. | |
| 2003/0156756 A1 | 8/2003 | Gokturk et al. | |
| 2003/0169906 A1 | 9/2003 | Gokturk et al. | |
| 2003/0208289 A1 | 11/2003 | Ben-Arie | |
| 2003/0218606 A1 | 11/2003 | Zhirkov et al. | |
| 2003/0231179 A1 | 12/2003 | Suzuki | |
| 2003/0235341 A1 | 12/2003 | Gokturk et al. | |
| 2004/0027329 A1 | 2/2004 | Nakamura | |
| 2004/0104935 A1 | 6/2004 | Williamson et al. | |
| 2004/0151366 A1 | 8/2004 | Nefian et al. | |
| 2004/0155962 A1 | 8/2004 | Marks | |
| 2004/0160444 A1 | 8/2004 | Salesin et al. | |
| 2004/0183775 A1 | 9/2004 | Bell | |
| 2005/0031166 A1 * | 2/2005 | Fujimura et al. | 382/103 |
| 2005/0058337 A1 | 3/2005 | Fujimura et al. | |
| 2005/0215319 A1 | 9/2005 | Rigopulos et al. | |
| 2006/0170769 A1 | 8/2006 | Zhou | |
| 2006/0177125 A1 | 8/2006 | Chan et al. | |
| 2006/0187305 A1 | 8/2006 | Trivedi et al. | |
| 2006/0252541 A1 | 11/2006 | Zalewski et al. | |
| 2007/0103471 A1 | 5/2007 | Yang et al. | |
| 2007/0110298 A1 | 5/2007 | Graepel et al. | |
| 2007/0285419 A1 | 12/2007 | Givon | |
| 2007/0298882 A1 * | 12/2007 | Marks et al. | 463/36 |
| 2008/0002856 A1 | 1/2008 | Ma et al. | |
| 2008/0026838 A1 | 1/2008 | Dunstan et al. | |
| 2008/0037829 A1 | 2/2008 | Givon | |
| 2008/0071507 A1 | 3/2008 | Hodgins et al. | |
| 2008/0123968 A1 | 5/2008 | Nevatia et al. | |
| 2008/0143718 A1 | 6/2008 | Ray et al. | |
| 2008/0152191 A1 | 6/2008 | Fujimura et al. | |
| 2008/0227073 A1 | 9/2008 | Bardsley et al. | |
| 2008/0252596 A1 | 10/2008 | Bell et al. | |
| 2009/0010490 A1 | 1/2009 | Wang et al. | |
| 2009/0041297 A1 | 2/2009 | Zhang et al. | |
| 2009/0085864 A1 | 4/2009 | Kutliroff et al. | |
| 2009/0096783 A1 | 4/2009 | Shpunt et al. | |
| 2009/0097728 A1 | 4/2009 | Lee et al. | |
| 2009/0122058 A1 | 5/2009 | Tschesnok | |
| 2009/0141933 A1 | 6/2009 | Wagg | |
| 2009/0154796 A1 | 6/2009 | Gupta et al. | |
| 2009/0183125 A1 | 7/2009 | Magal et al. | |
| 2009/0221368 A1 | 9/2009 | Yen et al. | |
| 2009/0221374 A1 * | 9/2009 | Yen et al. | 463/42 |
| 2009/0232353 A1 * | 9/2009 | Sundaresan et al. | 382/103 |
| 2009/0237499 A1 | 9/2009 | Kressel et al. | |
| 2009/0245577 A1 | 10/2009 | Liu et al. | |
| 2009/0271038 A1 | 10/2009 | Song et al. | |
| 2009/0296991 A1 | 12/2009 | Anzola | |
| 2010/0007717 A1 | 1/2010 | Spektor et al. | |
| 2010/0034457 A1 | 2/2010 | Berliner et al. | |
| 2010/0054525 A1 | 3/2010 | Gong et al. | |
| 2010/0111370 A1 | 5/2010 | Black et al. | |
| 2010/0195869 A1 | 8/2010 | Geiss | |
| 2010/0235786 A1 | 9/2010 | Maizels et al. | |
| 2010/0278391 A1 | 11/2010 | Hsu et al. | |
| 2011/0044524 A1 | 2/2011 | Wang et al. | |
| 2011/0052006 A1 | 3/2011 | Gurman et al. | |
| 2011/0080336 A1 | 4/2011 | Leyvand et al. | |
| 2011/0080475 A1 * | 4/2011 | Lee et al. | 348/77 |
| 2011/0081044 A1 | 4/2011 | Peeper et al. | |
| 2011/0081045 A1 * | 4/2011 | Lee et al. | 382/103 |
| 2011/0234589 A1 * | 9/2011 | Lee et al. | 345/424 |
| 2012/0057753 A1 * | 3/2012 | Lee et al. | 382/103 |
| 2012/0128208 A1 * | 5/2012 | Leyvand et al. | 382/103 |
| 2012/0281904 A1 | 11/2012 | Gong et al. | |
| 2013/0070058 A1 * | 3/2013 | Lee et al. | 348/46 |
| 2013/0243257 A1 * | 9/2013 | Lee et al. | 382/103 |
| 2014/0022161 A1 * | 1/2014 | Leyvand et al. | 345/156 |
| 2014/0044309 A1 * | 2/2014 | Leyvand et al. | 382/103 |
| 2014/0112547 A1 * | 4/2014 | Peeper et al. | 382/107 |

FOREIGN PATENT DOCUMENTS

| | | |
|---|---|---|
| JP | 08044490 A | 2/1996 |
| JP | 9-231369 A | 9/1997 |
| JP | 2001-513244 A | 8/2001 |
| JP | 2003-109015 A | 4/2003 |
| JP | 2007-61210 A | 3/2007 |
| JP | 2009536731 A | 10/2009 |
| KR | 10-2001-0042673 A | 5/2001 |
| KR | 10-2007-0061231 A | 6/2007 |
| KR | 10-2009-0069704 A | 7/2009 |
| WO | WO 93/10708 A1 | 6/1993 |
| WO | WO 97/17598 A1 | 5/1997 |
| WO | WO 99/32959 A2 | 7/1999 |
| WO | WO 99/44698 A1 | 9/1999 |
| WO | WO 2007/132451 A2 | 11/2007 |
| WO | WO 2009/059065 A1 | 5/2009 |

OTHER PUBLICATIONS

Aggarwal et al., "Human Motion Analysis: A Review", IEEE Non-rigid and Articulated Motion Workshop, 1997, University of Texas at Austin, Austin, TX.

(56) References Cited

OTHER PUBLICATIONS

Azarbayejani et al., "Visually Controlled Graphics", Jun. 1993, vol. 15, No. 6, IEEE Transactions on Pattern Analysis and Machine Intelligence.
Berendsen et al., "Volumetric Modeling of 3D Human Pose from Multiple Video", of the SAMT Workshop on Semantic 3D Media, Department of Information and Computing Sciences, Utrecht University, Aug. 31, 2009, 8 pages.
Breen et al., "Interactive Occlusion and Collusion of Real and Virtual Objects in Augmented Reality", Technical Report ECRC-95-02, 1995, European Computer-Industry Research Center GmbH, Munich, Germany.
Brogan et al., "Dynamically Simulated Characters in Virtual Environments", Sep./Oct. 1998, pp. 2-13, vol. 18, Issue 5, IEEE Computer Graphics and Applications.
Caillette et al., "Real-Time 3-D Human Body Tracking using Variable Length Markov Models", Advanced Interfaces Group, School of Computer Science, University of Manchester, In British Machine Vision Conference, (Non Month Available) 2005, 469-478.
Caillette et al., "Real-Time Markerless Human Body Tracking with Multi-View 3-D Voxel Reconstruction", In Proc. BMVC, (No Month Available) 2004, 597-606.
Caillette, "Real-Time Multi-View Human Body Tracking using 3D Voxel Reconstruction and High-Level Movement Prediction", A Transfer Report Submitted to the University of Manchester in the Faculty of Science and Engineering, Department of Computer Science, Aug. 2002, 1-51.
Chun et al., "3D Star Skeleton for Fast Human Posture Representation", World Academy of Science, Engineering and Technology, Apr. 4, 2008, 273-282.
Fisher et al., "Virtual Environment Display System", ACM Workshop on Interactive 3D Graphics, Oct. 1986, Chapel Hill, NC.
Freeman et al., "Television Control by Hand Gestures", Dec. 1994, Mitsubishi Electric Research Laboratories, TR94-24, Caimbridge, MA.
Granieri et al., "Simulating Humans in VR", The British Computer Society, Oct. 1994, Academic Press.
Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.
He, "Generation of Human Body Models", Apr. 2005, University of Auckland, New Zealand.
Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.
International Search Report issued for International patent application No. PCT/US2010/055179, Jun. 28, 2011, 11 pages.
Isard et al., "CONDENSATION—Conditional Density Propagation for Visual Tracking", 1998, pp. 5-28, International Journal of Computer Vision 29(1), Netherlands.
Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.
Kohler, "Special Topics of Gesture Recognition Applied in Intelligent Home Environments", In Proceedings of the Gesture Workshop, 1998, pp. 285-296, Germany.
Kohler, "Technical Details and Ergonomical Aspects of Gesture Recognition applied in Intelligent Home Environments", 1997, Germany.
Kohler, "Vision Based Remote Control in Intelligent Home Environments", University of Erlangen-Nuremberg/Germany, 1996, pp. 147-154, Germany.
Li et al., "A Real-Time 3D Human Body Tracking and Modeling System", IEEE International Conference on Image Processing, Oct. 8-11, 2006, 2809-2812.
Livingston, "Vision-based Tracking with Dynamic Structured Light for Video See-through Augmented Reality", 1998, University of North Carolina at Chapel Hill, North Carolina, USA.
Miyagawa et al., "CCD-Based Range Finding Sensor", Oct. 1997, pp. 1648-1652, vol. 44 No. 10, IEEE Transactions on Electron Devices.
Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.
PCT Application No. PCT/US2010/051599: International Search Report and Written Opinion of the International Searching Authority, Jun. 23, 2011, 10 pages.
PCT Application No. PCT/US2010/051662 : International Search Report and Written Opinion of the International Searching Authority, Jun. 15, 2011, 8 pages.
PCT application No. PCT/US2010/055171, International Search Report of the International Searching Authority, Jul. 22, 2011, 12 pages.
Qian et al., "A Gesture-Driven Multimodal Interactive Dance System", Jun. 2004, pp. 1579-1582, IEEE International Conference on Multimedia and Expo (ICME), Taipei, Taiwan.
Robertson et al., "Human Body Posture via Hierarchical Evolutionary Optimization", Joint Research Institute on Image and Signal Processing, School of Engineering and Physical Sciences, Heriot Watt University, UK, In BMVC06, (Non Month Available) 2006, 1-10.
Rosenhahn et al., "Automatic Human Model Generation", 2005, pp. 41-48, University of Auckland (CITR), New Zealand.
Shao et al., "An Open System Architecture for a Multimedia and Multimodal User Interface", Aug. 24, 1998, Japanese Society for Rehabilitation of Persons with Disabilities (JSRPD), Japan.
Sheridan et al., "Virtual Reality Check", Technology Review, Oct. 1993, pp. 22-28, vol. 96, No. 7.
Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.
Sminchisescu et al., "Kinematic Jump Processes for Monocular 3D Human Tracking", Appearing in Proceedings IEEE Conference on Computer Vision and Pattern Recognition, (Non Month Available) 2003, 1-8.
Stenger, "Model-Based Hand Tracking Using a Hierarchical Bayesian Filter", Dissertation submitted to the University of Cambridge for the degree of Doctor of Philosophy, St. John's College, Mar. 2004, 165 pages.
Stevens, "Flights into Virtual Reality Treating Real World Disorders", The Washington Post, Mar. 27, 1995, Science Psychology, 2 pages.
Theobalt et al., "Combining 2D Feature Tracking and Volume Reconstruction for Online Video-Based Human Motion Capture", In Proceedings of Pacific Graphics, Beijing, China, Oct. 9-11, 2002, 1-8.
U.S. Appl. No. 12/575,363: Final Office Action dated Jun. 6, 2013, 8 pages.
U.S. Appl. No. 12/616,471: Notice of Allowance dated Jun. 25, 2013, 7 pages.
U.S. Appl. No. 13/678,288: Non-final Office Action dated Jul. 8, 2013, 8 pages.
U.S. Appl. No. 12/575,363: Non-final office action dated Jan. 7, 2013, 8 pages.
U.S. Appl. No. 12/575,363: Requirement for Restriction/Election dated Sep. 27, 2012, 5 pages.
U.S. Appl. No. 12/575,388: Non-final office action Jun. 4, 2012, 9 pages.
U.S. Appl. No. 12/575,388: Notice of Allowance dated Jan. 9, 2013, 8 pages.
Urtasun et al., "3D Human Body Tracking using Deterministic Temporal Motion Models", Computer Vision Laboratory, EPFL, Aug. 12, 2009, 1-14.
Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.
Wu, et al., "Human Pose Estimation in Vision Sensor Networks via Distributed Local Processing and Nonparametric Belief Propaga-

(56) References Cited

OTHER PUBLICATIONS tion", Wireless Sensor Networks Lab, Department of Electrical Engineering, Stanford University, (No Month Available) 2008, 13 pages.

Xu et al., "Human Detection Using Depth and Gray Images", Proceedings of the IEEE Conference on Advanced Video and Signal Based Surveillance (AVSS'03), Jul. 21-22, 2003, 115-121.

Yamane et al., "Human Motion Database with a Binary Tree and Node Transition Graphs", Proceedings of Robotics: Science and Systems, Jun. 2009, 8 pages.

Zhao, "Dressed Human Modeling, Detection, and Parts Localization", Paper, doctoral dissertation, tech. report CMU-RI-TR-01-19, Robotics Institute, Carnegie Mellon University, Jul. 2001, 1-107.

Zhao, "Dressed Human Modeling, Detection, and Parts Localization", 2001, The Robotics Institute, Carnegie Mellon University, Pittsburgh, PA.

U.S. Appl. No. 12/616,471; Notice of Allowance; dated May 15, 2014; 8 pages.

"Office Action Issued in Japanese Patent Application No. 2012-533286", Mailed Date: Jul. 11, 2014, 8 Pages.

\* cited by examiner

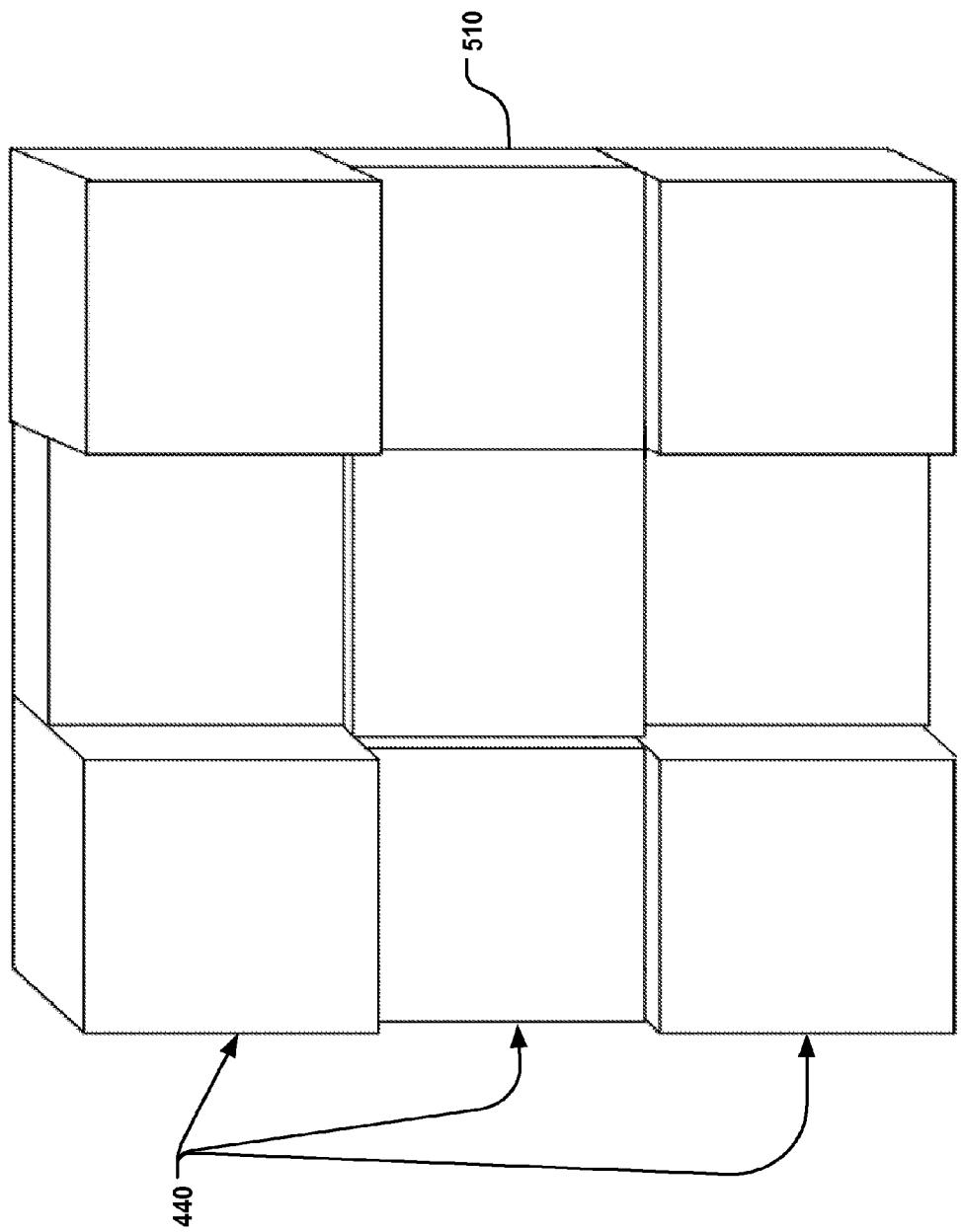

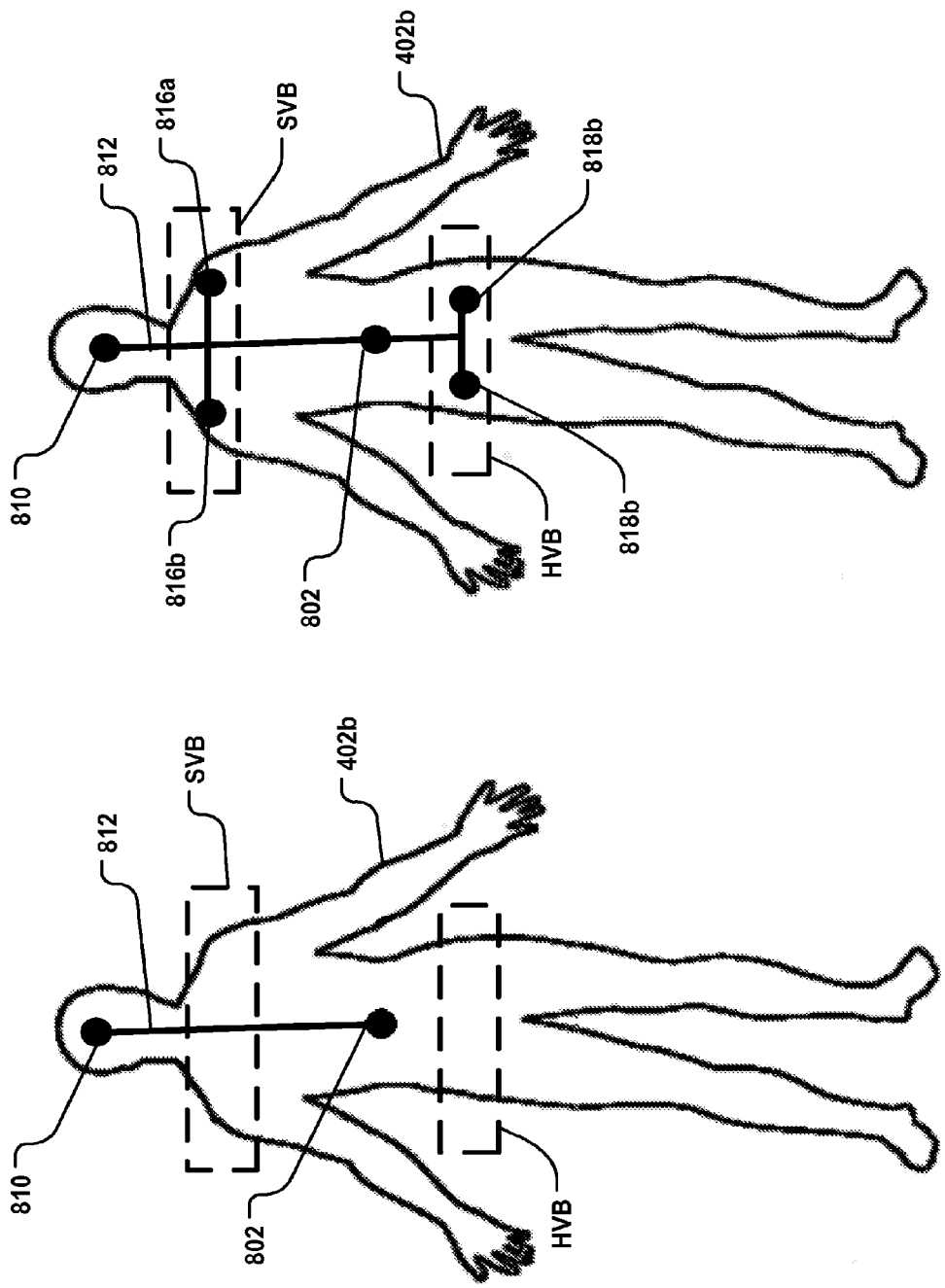

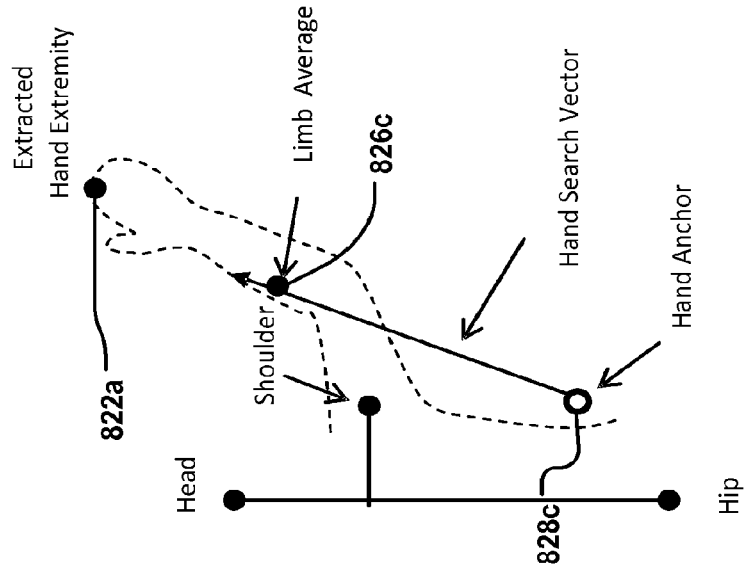
FIG. 15C
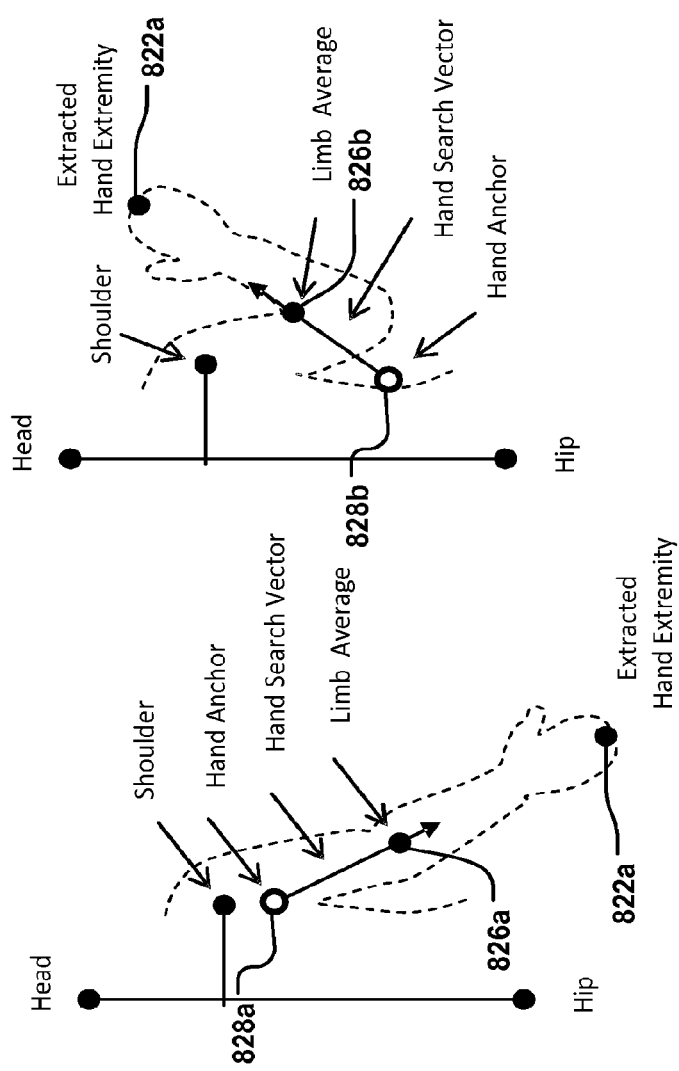
FIG. 15B
FIG. 15A

HUMAN TRACKING SYSTEM

CROSS REFERENCE TO RELATED APPLICATIONS

This application is a continuation of U.S. patent application Ser. No. 13/365,121 filed Feb. 2, 2012, which is a continuation of U.S. patent application Ser. No. 12/575,388 filed on Oct. 7, 2009. Each of which is hereby incorporated by reference in its entirety.

BACKGROUND

Many computing applications such as computer games, multimedia applications, or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat.

SUMMARY

Disclosed herein are systems and methods for tracking a user in a scene. For example, an image such as depth image of a scene may be received or observed. A grid of voxels may then be generated based on the depth image such that the depth image may be downsampled. For example, the depth image may include a plurality of pixels that may be divided into portions or blocks. A voxel may then be generated for each portion or block such that the received depth image may be downsampled into the grid of voxels.

According to one embodiment, a background included in the grid of voxels may then be removed to isolate one or more voxels associated with a foreground object such as a human target. A location or position of one or more extremities such as a centroid or center, head, shoulders, hips, arms, hands, elbows, legs, feet, knees, or the like of the isolated human target may be determined. Additionally, dimensions such as measurements including widths, lengths, or the like of the extremities may be determined.

A model may then be adjusted based on the location or position of the one or more extremities and/or the dimensions determined therefore. For example, the model may be a skeletal model that may include joints and/or bones. One or more of the joints of the model may be adjusted such that the one or more joints may be assigned to the location or position of the one or more extremities corresponding thereto and/or the bones defined therebetween may be adjusted to the dimensions of the one or more extremities corresponding thereto.

The adjusted model may be processed. For example, in one embodiment, the adjusted may be mapped to an avatar or game character such that the avatar or game character may be animated to mimic the user and/or the adjusted model may be provided to a gestures library in a computing environment that may be used to determine controls to perform within an application based on positions of various body parts in the model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 7A-7B illustrate an example embodiment of a portion of the depth image being downsampled.

FIG. 12 illustrates an example embodiment of a shoulders volume box and a hips volume box determined based on a head-to-center vector.

FIG. 13 illustrates an example embodiment of shoulders and hips that may be calculated based on a shoulders volume box and a hips volume box.

FIGS. 15A-15C illustrate example embodiments of a hand being determined based on anchor points.

DETAILED DESCRIPTION OF ILLUSTRATIVE EMBODIMENTS

Figure 1A:
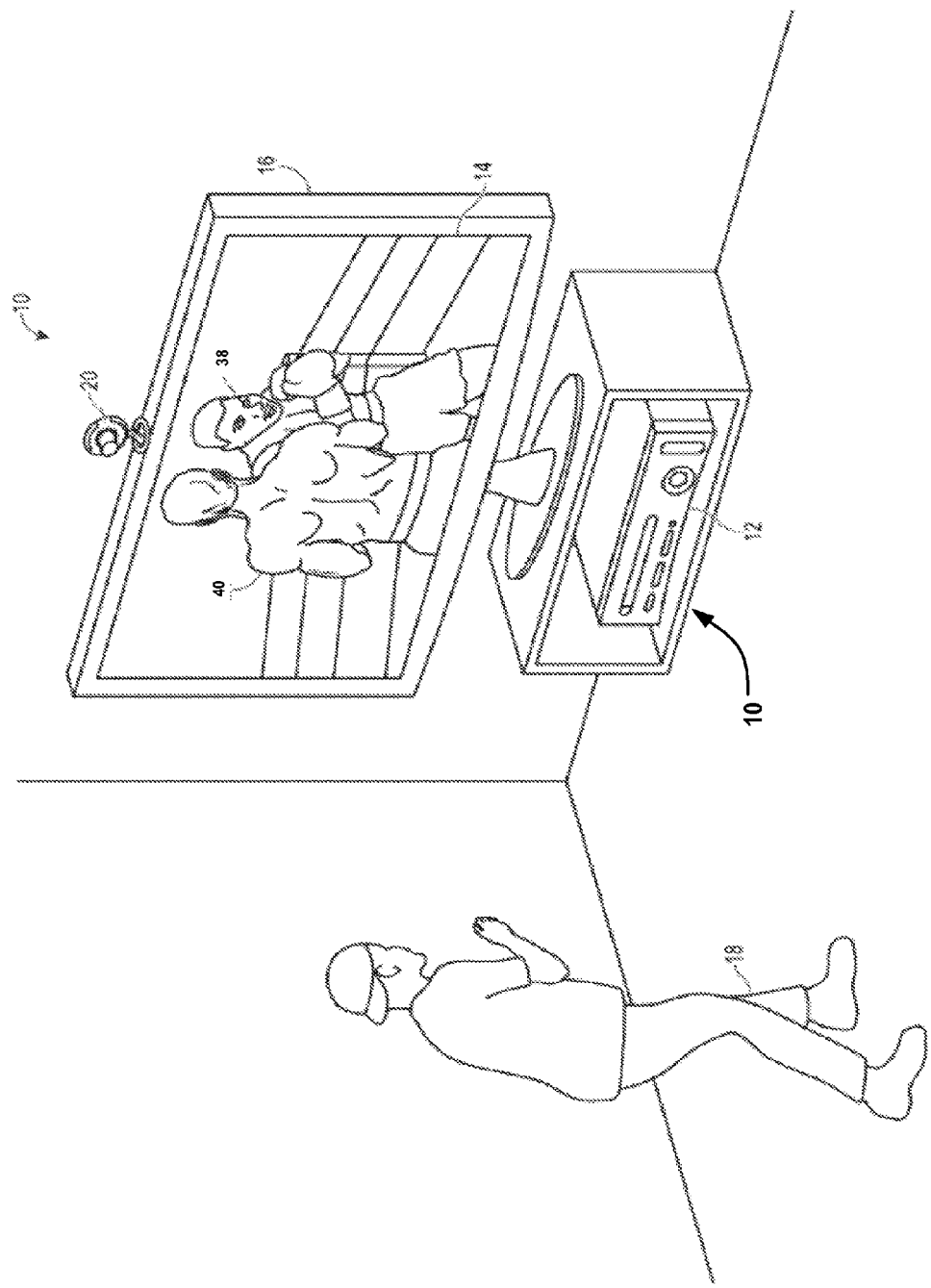
FIGS. 1A and 1B illustrate an example embodiment of a target recognition, analysis, and tracking system with a user playing a game.
Figure 1B:
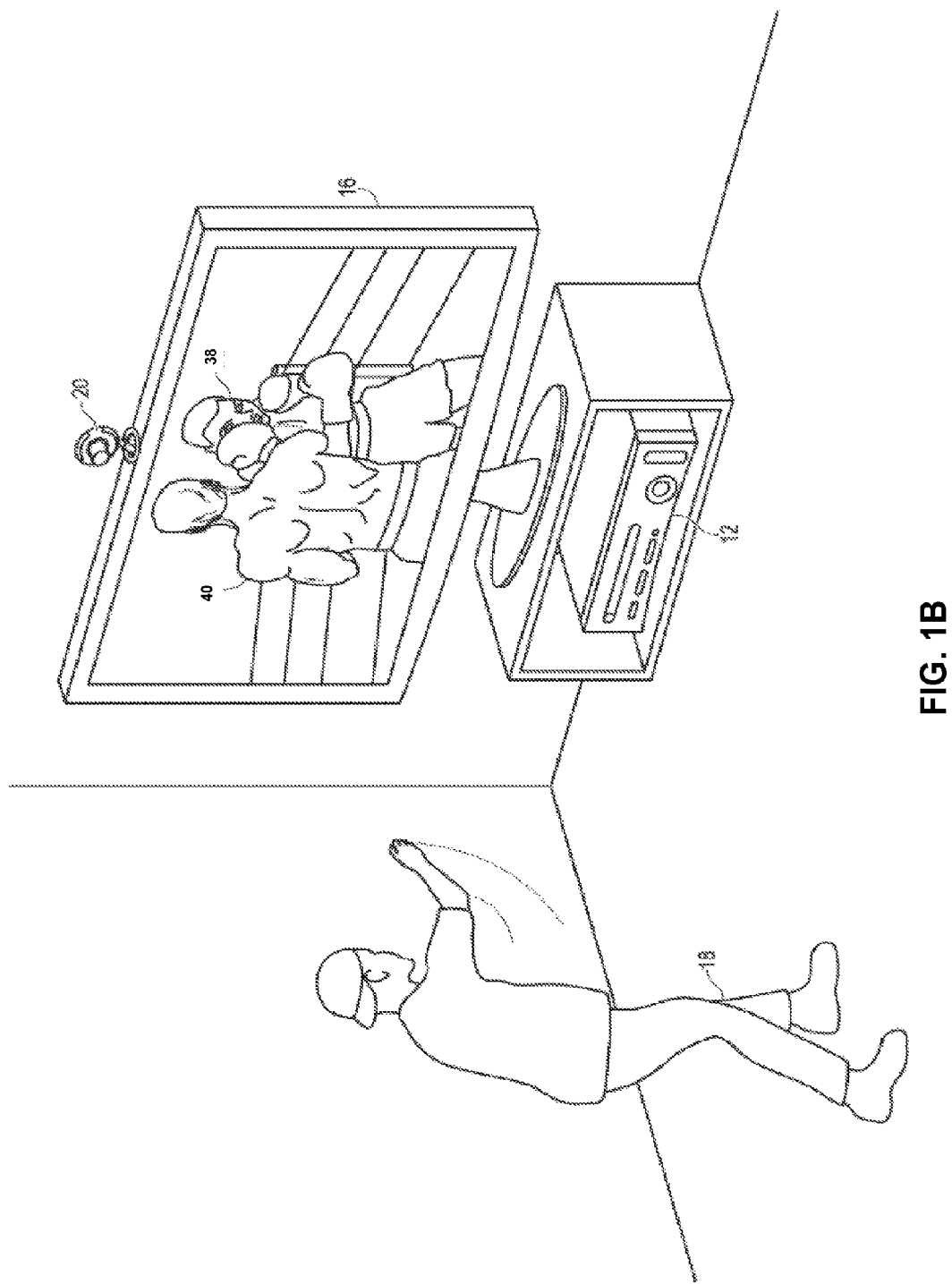

FIGS. 1A and 1B illustrate an example embodiment of a configuration of a target recognition, analysis, and tracking system 10 with a user 18 playing a boxing game. In an example embodiment, the target recognition, analysis, and tracking system 10 may be used to recognize, analyze, and/or track a human target such as the user 18.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like. In one embodiment, the computing environment 12 may include a processor such as a standardized processor, a specialized processor, a microprocessor, or the like that may execute instructions including, for example, instructions for receiving a depth image; generating a grid of voxels based on the depth image; removing a background included in the grid of voxels to isolate one or more voxels associated with a human target; determining a location or position of one or more extremities of the isolated human target; adjusting a model based on the location or position of the one or more extremities, or any other suitable instruction, which will be described in more detail below.

As shown in FIG. 1A, the target recognition, analysis, and tracking system 10 may further include a capture device 20. The capture device 20 may be, for example, a camera that may be used to visually monitor one or more users, such as the user 18, such that gestures and/or movements performed by the one or more users may be captured, analyzed, and tracked to perform one or more controls or actions within an application and/or animate an avatar or on-screen character, as will be described in more detail below.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis, and tracking system 10 may be used to recognize, analyze, and/or track a human target such as the user 18. For example, the user 18 may be tracked using the capture device 20 such that the gestures and/or movements of user 18 may be captured to animate an avatar or on-screen character and/or may be interpreted as controls that may be used to affect the application being executed by computer environment 12. Thus, according to one embodiment, the user 18 may move his or her body to control the application and/or animate the avatar or on-screen character.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 38 to the user 18. The computing environment 12 may also use the audiovisual device 16 to provide a visual representation of a player avatar 40 that the user 18 may control with his or her movements. For example, as shown in FIG. 1B, the user 18 may throw a punch in physical space to cause the player avatar 40 to throw a punch in game space. Thus, according to an example embodiment, the computer environment 12 and the capture device 20 of the target recognition, analysis, and tracking system 10 may be used to recognize and analyze the punch of the user 18 in physical space such that the punch may be interpreted as a game control of the player avatar 40 in game space and/or the motion of the punch may be used to animate the player avatar 40 in game space.

Other movements by the user 18 may also be interpreted as other controls or actions and/or used to animate the player avatar, such as controls to bob, weave, shuffle, block, jab, or throw a variety of different power punches. Furthermore, some movements may be interpreted as controls that may correspond to actions other than controlling the player avatar 40. For example, in one embodiment, the player may use movements to end, pause, or save a game, select a level, view high scores, communicate with a friend, etc. According to another embodiment, the player may use movements to select the game or other application from a main user interface. Thus, in example embodiments, a full range of motion of the user 18 may be available, used, and analyzed in any suitable manner to interact with an application.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to other example embodiments, the target recognition, analysis, and tracking system 10 may further be used to interpret target movements as operating system and/or application controls that are outside the realm of games. For example, virtually any controllable aspect of an operating system and/or application may be controlled by movements of the target such as the user 18.

Figure 2:
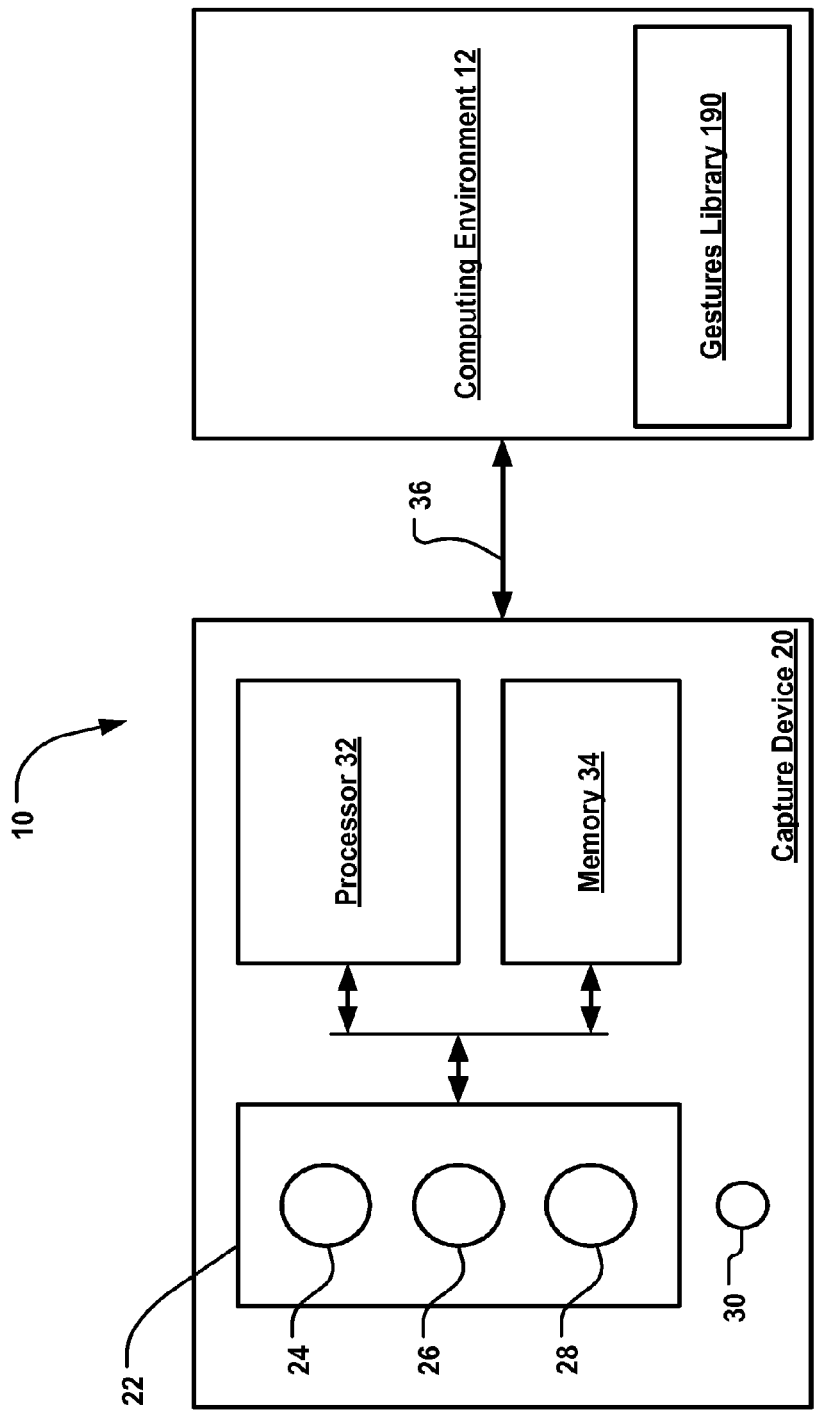
FIG. 2 illustrates an example embodiment of a capture device that may be used in a target recognition, analysis, and tracking system.

FIG. 2 illustrates an example embodiment of the capture device 20 that may be used in the target recognition, analysis, and tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles to obtain visual stereo data that may be resolved to generate depth information.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions including, for example, instructions for receiving a depth image; generating a grid of voxels based on the depth image; removing a background included in the grid of voxels to isolate one or more voxels associated with a human target; determining a location or position of one or more extremities of the isolated human target; adjusting a model based on the location or position of the one or more extremities, or any other suitable instruction, which will be described in more detail below.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and/or a skeletal model that may be generated by the capture device 20 to the computing environment 12 via the communication link 36. The computing environment 12 may then use the model, depth information, and captured images to, for example, control an application such as a game or word processor and/or animate an avatar or on-screen character. For example, as shown, in FIG. 2, the computing environment 12 may include a gestures library 190. The gestures library 190 may include a collection of gesture filters, each comprising information concerning a gesture that may be performed by the skeletal model (as the user moves). The data captured by the cameras 26, 28 and the capture device 20 in the form of the skeletal model and movements associated with it may be compared to the gesture filters in the gesture library 190 to identify when a user (as represented by the skeletal model) has performed one or more gestures. Those gestures may be associated with various controls of an application. Thus, the computing environment 12 may use the gestures library 190 to interpret movements of the skeletal model and to control an application based on the movements.

Figure 3:
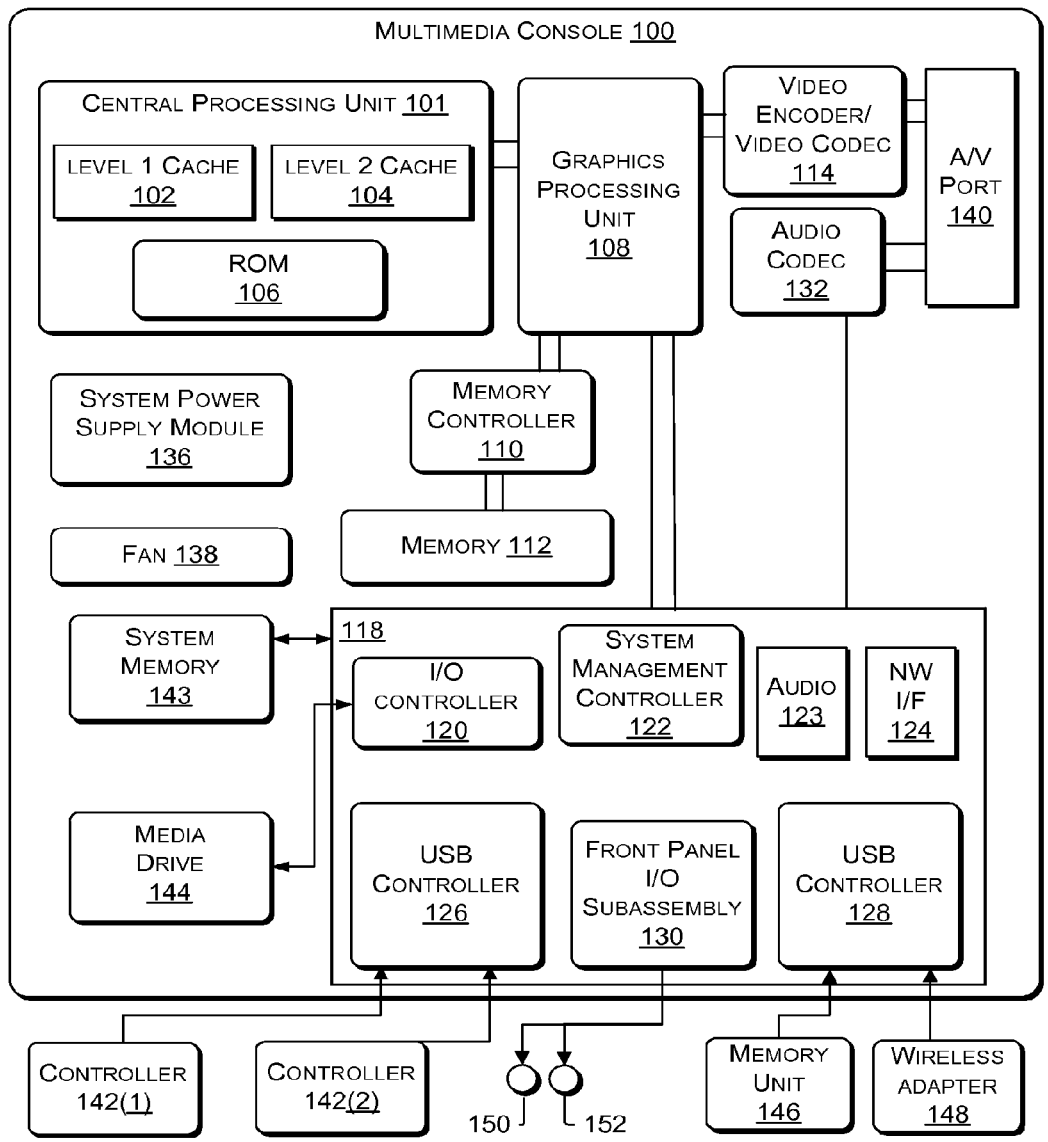
FIG. 3 illustrates an example embodiment of a computing environment that may be used to interpret one or more gestures in a target recognition, analysis, and tracking system and/or animate an avatar or on-screen character displayed by a target recognition, analysis, and tracking system.

FIG. 3 illustrates an example embodiment of a computing environment that may be used to interpret one or more gestures in a target recognition, analysis, and tracking system and/or animate an avatar or on-screen character displayed by the target recognition, analysis, and tracking system. The computing environment such as the computing environment 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

Figure 4:
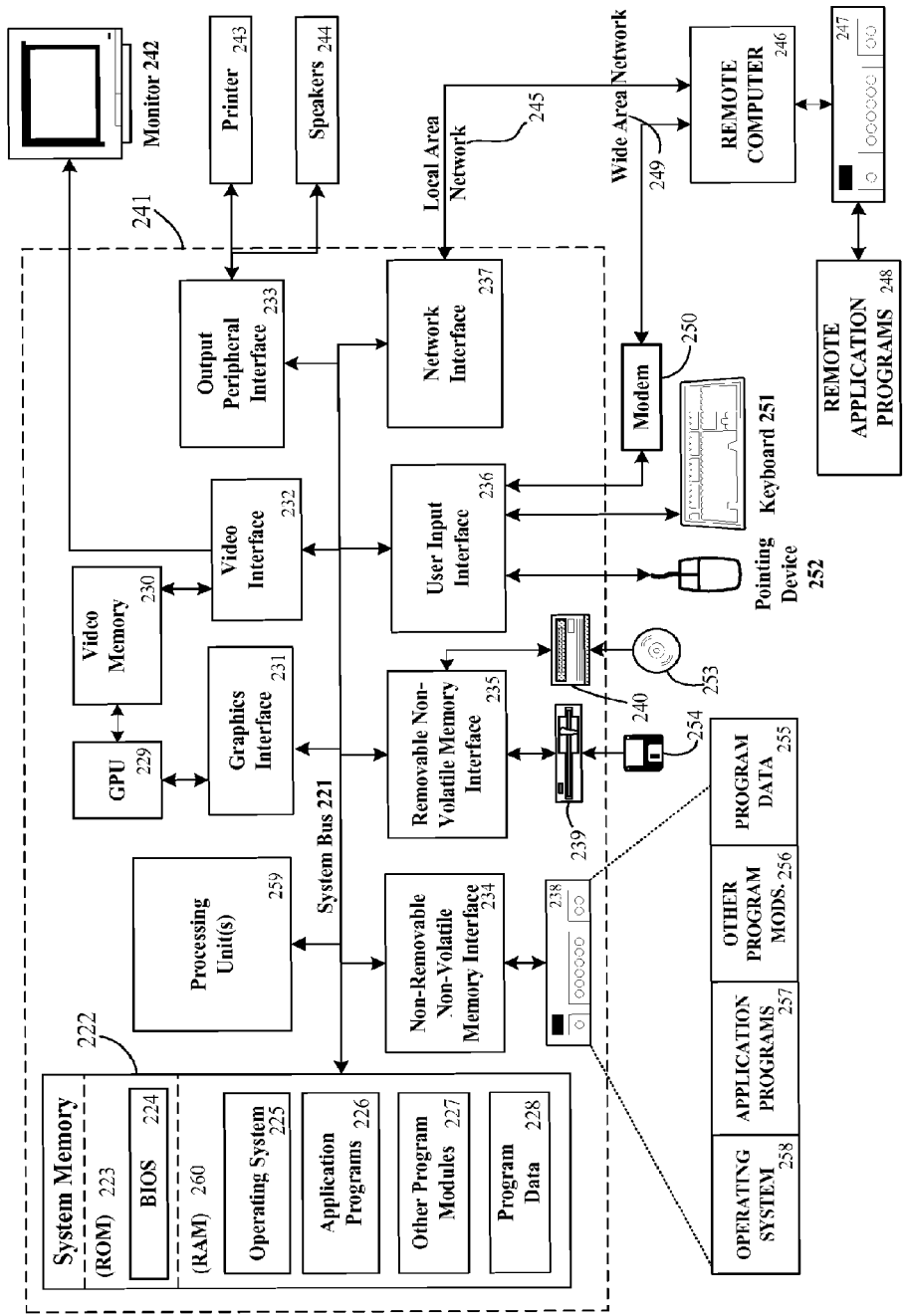
FIG. 4 illustrates another example embodiment of a computing environment that may be used to interpret one or more gestures in a target recognition, analysis, and tracking system and/or animate an avatar or on-screen character displayed by a target recognition, analysis, and tracking system.

FIG. 4 illustrates another example embodiment of a computing environment 220 that may be the computing environment 12 shown in FIGS. 1A-2 used to interpret one or more gestures in a target recognition, analysis, and tracking system and/or animate an avatar or on-screen character displayed by a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

Figure 5:
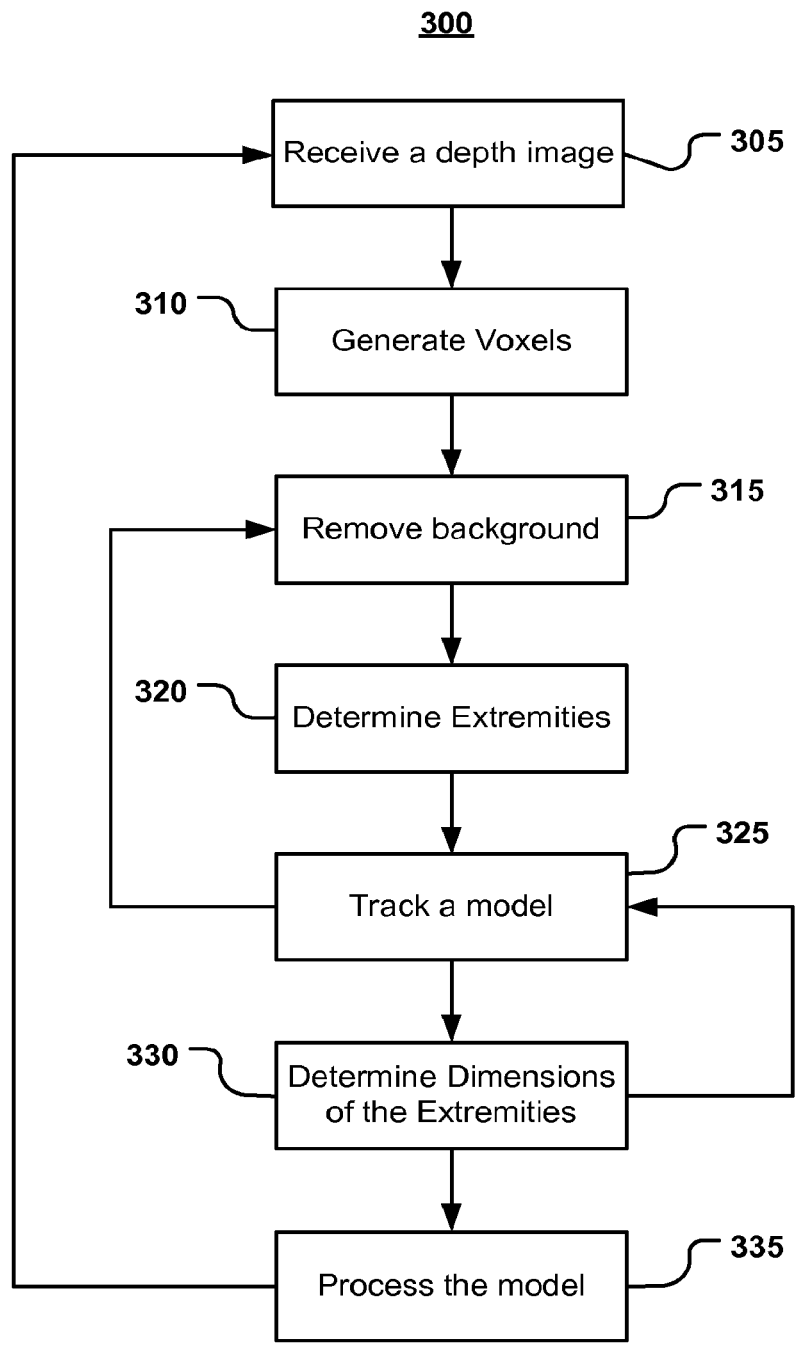
FIG. 5 depicts a flow diagram of an example method for tracking a user in a scene.

FIG. 5 depicts a flow diagram of an example method 300 for tracking a user in a scene. The example method 300 may be implemented using, for example, the capture device 20 and/or the computing environment 12 of the target recognition, analysis, and tracking system 10 described with respect to FIGS. 1A-4. In an example embodiment, the example method 300 may take the form of program code (i.e., instructions) that may be executed by, for example, the capture device 20 and/or the computing environment 12 of the target recognition, analysis, and tracking system 10 described with respect to FIGS. 1A-4.

According to one embodiment, at 305, a depth image may be received. For example, the target recognition, analysis, and tracking system may include a capture device such as the capture device 20 described above with respect to FIGS. 1A-2. The capture device may capture or observe a scene that may include one or more targets. In an example embodiment, the capture device may be a depth camera configured to obtain an image such as a depth image of the scene using any suitable technique such as time-of-flight analysis, structured light analysis, stereo vision analysis, or the like.

The depth image may be a plurality of observed pixels where each observed pixel has an observed depth value. For example, the depth image may include a two-dimensional (2-D) pixel area of the captured scene where each pixel in the 2-D pixel area may have a depth value such as a length or distance in, for example, centimeters, millimeters, or the like of an object in the captured scene from the capture device.

Figure 6:
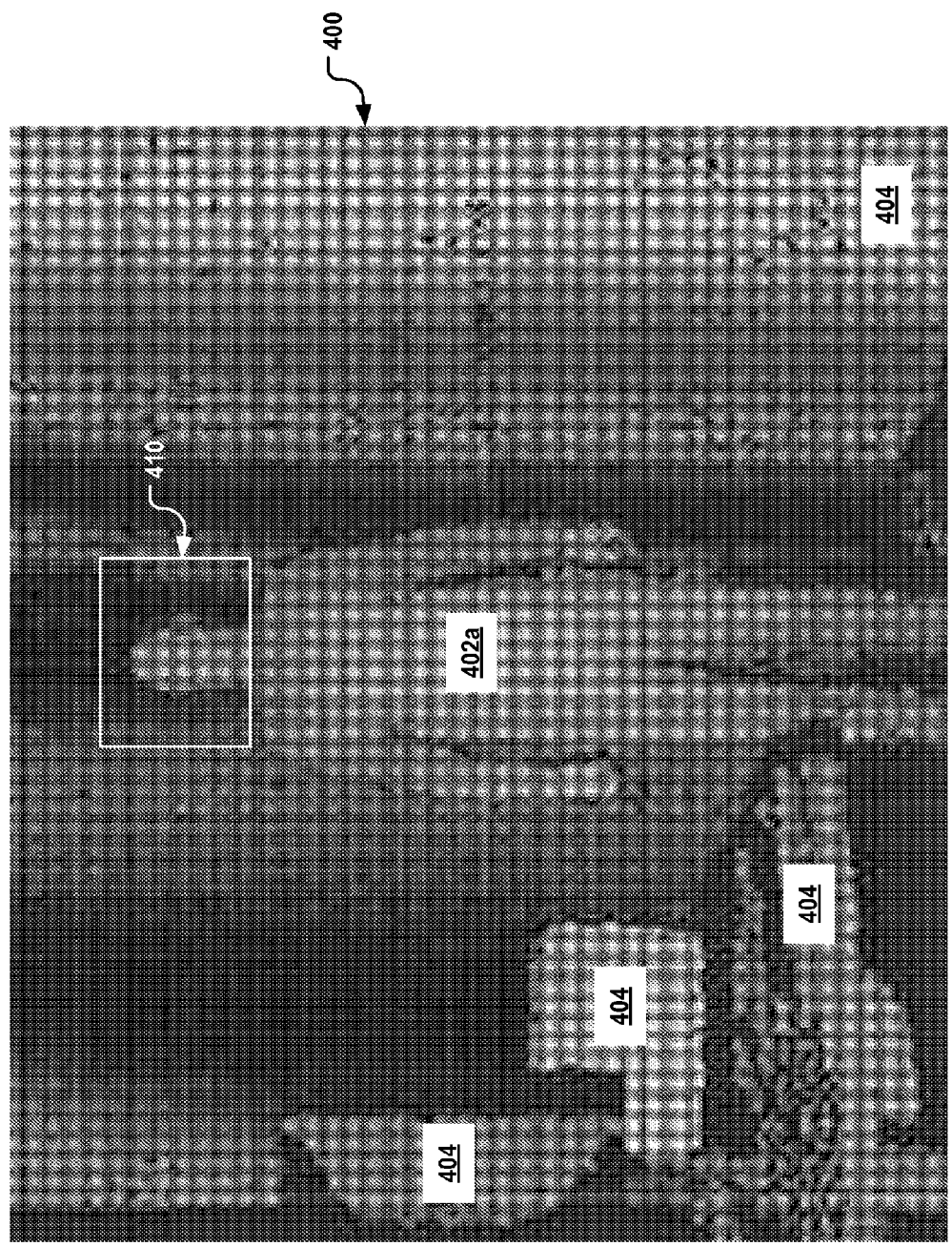
FIG. 6 illustrates an example embodiment of a depth image that may be captured or observed.

FIG. 6 illustrates an example embodiment of a depth image 400 that may be received at 305. According to an example embodiment, the depth image 400 may be an image or frame of a scene captured by, for example, the 3-D camera 26 and/or the RGB camera 28 of the capture device 20 described above with respect to FIG. 2. As shown in FIG. 6, the depth image 400 may include a human target 402a corresponding to, for example, a user such as the user 18 described above with respect to FIGS. 1A and 1B and one or more non-human targets 404 such as a wall, a table, a monitor, or the like in the captured scene. As described above, the depth image 400 may include a plurality of observed pixels where each observed pixel has an observed depth value associated therewith. For example, the depth image 400 may include a two-dimensional (2-D) pixel area of the captured scene where each pixel at a particular X-value and Y-value in the 2-D pixel area may have a depth value such as a length or distance in, for example, centimeters, millimeters, or the like of a target or object in the captured scene from the capture device.

In one embodiment, the depth image 400 may be colorized such that different colors of the pixels of the depth image correspond to and/or visually depict different distances of the human target 402a and non-human targets 404 from the capture device. For example, the pixels associated with a target closest to the capture device may be colored with shades of red and/or orange in the depth image whereas the pixels associated with a target further away may be colored with shades of green and/or blue in the depth image.

Referring back to FIG. 5, in one embodiment, upon receiving the image, at 305, one or more high-variance and/or noisy depth values may be removed and/or smoothed from the depth image; portions of missing and/or removed depth information may be filled in and/or reconstructed; and/or any other suitable processing may be performed on the received depth image may such that the depth information associated with the depth image may used to generate a model such as a skeletal model, which will be described in more detail below.

According to an example embodiment, at 310, a grid of one or more voxels may be generated based on the received depth image. For example, the target recognition, analysis, and tracking system may downsample the received depth image by generating one or more voxels using information included in the received depth image such that a downsampled depth image may be generated. In one embodiment, the one or more voxels may be volume elements that may represent data or values of the information included in the received depth image on a sub-sampled grid.

For example, as described above, the depth image may include a 2-D pixel area of the captured scene where each pixel may have an X-value, a Y-value, and a depth value (or Z-value) associated therewith. In one embodiment, the depth image may be downsampled by reducing the pixels in the 2-D pixel area into a grid of one or more voxels. For example, the depth image may be divided into portions or blocks of pixels such as 4×4 blocks of pixels, 5×5 blocks of pixels, 8×8 block of pixels, a 10×10 block of pixels, or the like. Each portion or block may be processed to generate a voxel for the depth image that may represent a position of the portion or block associated the pixels of the 2-D depth image in real-world space. According to an example embodiment, the position of each voxel may be generated based on, for example, an average depth value of the valid or non-zero depth values for the pixels in the block or portion that the voxel may represent, a minimum, maximum, and/or a median depth value of the pixels in the portion or block that the voxel may represent, an average of the X-values and Y-values for pixels having a valid depth value in the portion or the block that the voxel may represent, or any other suitable information provided by the depth image. Thus, according to an example embodiment, each voxel may represent a sub-volume portion or block of the depth image having values such as an average depth value of the valid or non-zero depth values for the pixels in the block or portion that the voxel may represent, a minimum, maximum, and/or a median depth value of the pixels in the portion or block that the voxel may represent, an average of the X-values and Y-values for pixels having a valid depth value in the portion or the block that the voxel may represent, or any other suitable information provided by the depth image based on the X-values, Y-values, and depth values of the corresponding portion or block of pixels of the depth image received at 305.

In one embodiment, the grid of the one or more voxels in the downsampled depth image may be layered. For example, the target recognition, analysis, and tracking system may generate voxels as described above. The target recognition, analysis, and tracking system may then stack a generated voxel over one or more other generated voxels in the grid.

According to an example embodiment, the target recognition, analysis, and tracking system may stack voxels in the grid around, for example, edges of objects in the scene that may be captured in the depth image. For example, a depth image received at 305 may include a human target and a non-human target such as a wall. The human target may overlap the non-human target such as the wall at, for example, an an edge of the human target. In one embodiment, the overlapping edge may include information such as depth values, X-values, Y-values, or the like associated with the human target and the non-human target that may be captured in the depth image. The target recognition, analyisis, and tracking system may generate a voxel associated with the human target and a voxel associated with the non-human target at the overlapping edge such that the voxels may be stacked and the information such as depth values, X-values, Y-values, or the like of the overlapping edge may be retained in the grid.

According to another embodiment, the grid of one or more voxels may be generated at 310 by projecting, for example, information such as the depth values, X-values, Y-values, or the like for the pixels in the depth image that may be received at 305 into a three-dimensional (3-D) space. For example, the target recognition, analysis, and tracking system may map information such as the depth values, X-values, Y-values, or the like for the pixels in the depth image to 3-D points in the 3-D space using a transformation such as a camera, image, or perspective transform such that the information may be transformed as trapezoidal or pyramidal shapes in the 3-D space. In one embodiment, the 3-D space having the trapezoidal or pyramidal shapes may be divided into blocks such as cubes that may create a grid of voxels such that each of the blocks or cubes may represent a voxel in the grid. For example, the target recognition, analysis, and tracking system may superimpose a 3-D grid over the 3-D points that correspond to the object in the depth image. The target recognition, analysis, and tracking system may then divide or chop up the grid into the blocks representing voxels to downsample the depth image into a lower resolution. According to an example embodiment, each of the voxels in the grid may include an average depth value of the valid or non-zero depth values for the pixels associated with the 3-D space in the grid that the voxel may represent, a minimum and/or maximum depth value of the pixels associated with the 3-D space in the grid that the voxel may represent, an average of the X-values and Y-values for pixels having a valid depth value associated with the 3-D space in the grid that the voxel may represent, or any other suitable information provided by the depth image.

Figure 7A:
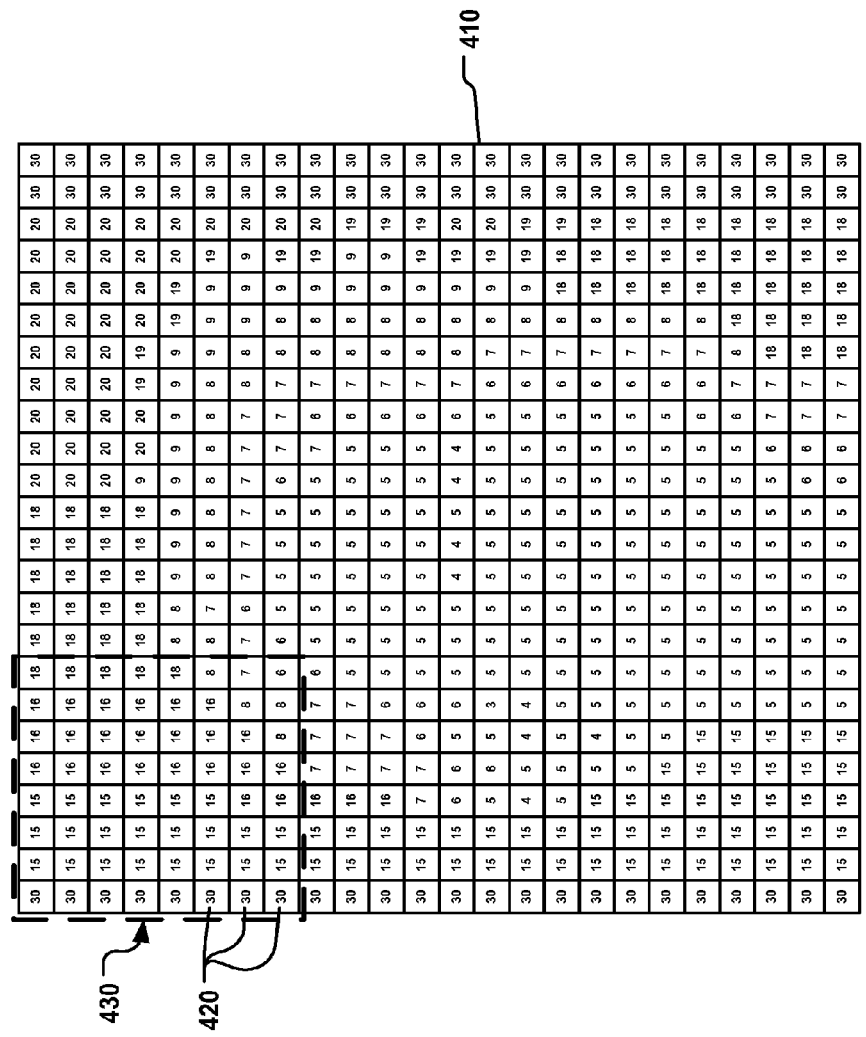

FIGS. 7A-7B illustrate an example embodiment of a portion of the depth image being downsampled. For example, as shown in FIG. 7A, a portion 410 of the depth image 400 described above with respect to FIG. 6 may include a plurality of pixels 420 where each pixel 420 may have an X-value, a Y-value, and a depth value (or Z-value) associated therewith. According to one embodiment, as described above, a depth image such as the depth image 400 may be downsampled by reducing the pixels in the 2-D pixel area into a grid of one or more voxels. For example, as shown in FIG. 7A, the portion 410 of the depth image 400 may be divided into a portion or a block 430 of the pixels 420 such as 8×8 block of the pixels 420. The target recognition, analysis, and tracking system may process the portion or block 430 to generate a voxel 440 that may represent a position of the portion or block 430 associated the pixels 420 in real-world space as shown in FIGS. 7A-7B.

Referring back to FIG. 5, at 315, the background may be removed from the downsampled depth image. For example, a background such as the non-human targets or objects in the downsampled depth image may be removed to isolate foreground objects such as a human target associated with a user. In one embodiment, as described above, the target recognition, analysis, and tracking system may downsample a captured or observed depth image by generating a grid of one or more voxels for the captured or observed depth image. The target recognition, analysis, and tracking system may analyze each of the voxels in the downsampled depth image to determine whether a voxel may be associated with a background object such as one or more non-human targets of the depth image. If a voxel may be associated with a background object, the voxel may be removed or discarded from the downsampled depth image such that a foreground object such as the human target and the one or more voxels in the grid associated with the foreground object may be isolated.

According to one embodiment, the target recognition, analysis, and tracking system may analyze each voxel to determine an object associated therewith. For example, as described above, a scene that may be observed or captured at 305 as a depth image such as the depth image 400 described above with respect to FIG. 6 may include a plurality of objects. The objects may include one or more human targets and/or one or more non-human targets such as a wall, a table, a couch, a lamp, or the like. In one embodiment, the target, recognition, analysis, and tracking system may analyze each voxel in the grid to determine which object in the scene the voxel may be as associated with such that the target recognition, analysis, and tracking system may identify voxels associated with each object in a scene at 315. Thus, according to an example embodiment, if a human target or person may be standing in front of a wall in a scene, the target recognition, analysis, and tracking system may analyze each voxel to determine whether the voxel may be associated with the human target or the wall.

To determine which object in the scene a voxel may be associated with, the target, recognition, analysis, and tracking system may compare values such as an average depth value of the valid or non-zero depth values for the pixels in the block or portion that the voxel may represent, a minimum and/or maximum depth value of the pixels in the portion or block that the voxel may represent, an average of the X values and Y values for pixels having a valid depth value that the voxel may represent, or any other suitable information of neighboring or nearby voxels. For example, in one embodiment, the average depth value associated with a particular voxel being analyzed in the grid may be compared to the average depth values of each voxel that may be adjacent to the particular voxel being analyzed in the grid. If the difference between the average depth value of the particular voxel being analyzed and an average depth value of an adjacent voxel may be less than a threshold, the particular voxel and the adjacent voxel may be identified as belonging to the same object. If the difference between the average depth value of the particular voxel being analyzed and an average depth value of an adjacent voxel may be greater than the threshold, the particular voxel and the adjacent voxel may be identified as belonging to separate objects. According to an example embodiment, the threshold may be a predetermined value generated by, for example, the target recognition, analysis, and tracking system that may be based on a likelihood or probability that voxels may be part of the same object. Thus, according to an example embodiment, if a human target or person may be standing in front of a wall in a scene captured or observed by the depth image, the target recognition, analysis, and tracking system may analyze each voxel generated for the depth image to determine whether the voxel may be associated with the human target or the wall.

After identifying the objects and the voxels associated therewith in the scene of the received depth image, the target recognition, analysis, and tracking system may then calculate information associated with each identified object. For example, the target recognition, analysis, and tracking system may calculate a maximum world space for each identified object, a minimum world space position, and an average world space position, or the like.

In one embodiment, the target recognition, analysis, and tracking system may further determine whether one or more of the objects identified in a scene should be merged with other objects in the scene at 315. For example, part or a portion of an object may be separated from another part or portion of the object in the depth image received at 305. According to one embodiment, the part or portion of an object may be separated from another part or portion of the object by an infrared shadow that may be cast by, for example, the object, another object, or the like in the scene. In another example embodiment, the part or portion of an object may be separated from another part or portion of the object by, for example, colors, textures, patterns, or the like associated with the object. For example, a head of a human target may be separated from a torso of the human target along a Y-plane in the Y-direction by, for example, facial hair, various articles of clothing, or the like.

To determine whether an object identified in the scene may actually be a part or a portion of another object identified in the scene, the target recognition, analysis, and tracking system may compare the X-values and the depth values of the voxels associated with the object with X-values and depth values of the voxels associated with nearby objects. For example, the target recognition, analysis, and tracking system may compare an X-value and a depth value of one or more voxels associated with, for example, a first object identified in the scene with an X-value and a depth value of one or more voxels associated with a second object that may be nearby or adjacent to the first object. Thus, according to an example embodiment, the target recognition, analysis, and tracking system may analyze the voxels in a scene to determine whether a first and second object may overlap along the X-plane defined in the X-direction and/or the Z-plane defined in the Z-direction such that the first and second objects may be merged and identified as being parts or portions of the same object.

According to one embodiment, if the X-value and the depth value of one or more voxels associated with the first object may overlap an X-value and a depth value of one or more voxels associated with the second object, the target recognition, analysis, and tracking system may merge the first and second objects such that the target recognition, analysis, and tracking system may identify the first and second objects as being parts or portions of a common object. For example, if the first voxel associated with the first object may have an X-value of 5 along the X-direction and a depth value of 10 mm at a right outer edge of the first object and the second voxel associated with the second object may have an X-value of 3 along the X-direction and a depth value of 10 mm at a left outer edge of the second object, the target recognition, analysis, and target system may determine that the first and second objects may overlap. The target, recognition, analysis, and tracking system may then merge the first and second objects such that the target, recognition, analysis, and tracking system may identify the first and second objects as being parts or portions of the same object.

Additionally, to determine whether an object identified in the scene may actually be a part or a portion of another object identified in the scene, the target recognition, analysis, and tracking system may determine whether a bounding box defined for an object overlaps a bounding box of another object in the scene. For example, the target recognition, analysis, and tracking system may define a bounding box for each identified object. The target recognition, analysis, and tracking system may then determine whether the bounding boxes of one or more objects overlap based on, for example, X-values, Y-values, and/or depth values of one or more voxels included therein as described above.

According to another example, embodiment, the target recognition, analysis, and tracking system may determine a center or centroid of each object by, for example, averaging the X-values, Y-values, and depth values of the voxels included in the object. The target recognition, analysis, and tracking system may then determine a distance between the centroid or center of objects in the scene to determine whether an object identified in the scene may actually be a part or a portion of another object identified in the scene. Based on the distance between objects, the target, recognition, analysis, and tracking system may merge one or more objects. For example, the target recognition, analysis, and tracking system may determine a distance between a centroid or center of a first object and a center or centroid of a second object. If the distance between the centroid or center of the first object and the second object may be within a predetermined range that indicates the first and second objects should be merged, the target recognition, analysis, and tracking system may merge the objects such that the target, recognition, analysis, and tracking system may identify the first and second objects as being parts or portions of the same object.

In one embodiment, the target recognition, analysis, and tracking system may further determine whether one or more of the objects identified in the scene should be separated at 315. For example, an object identified in the scene at 315 may actually be two separate objects. To determine whether an object in the scene should be separated, the target recognition, analysis, and tracking system may identify a location of a center of each object determined for a previously received frame. According to one embodiment, the target recognition, analysis, and tracking system may then simultaneously flood-fill the voxels in the scene generated for the depth image of the frame received at 305 starting with the location of the center determined from the objects of the previously received frame. The target recognition, analysis, and tracking system may then determine which object in the previously received frame the floodfilled voxels may be closer to using the previous locations for the objects. The target recognition, analysis, and tracking system may split an object at 315 if the floodfilled voxels may be closer to another object identified in a previously received frame.

At 315, the target recognition, analysis, and tracking system may then determine whether the identified objects may be a background object such as non-human target or a foreground object such as a human target. According to an example embodiment, the target recognition, analysis, and tracking system may determine whether the identified objects may be a background object or a foreground object based on whether the identified objects may be in motion or moving. For example, the target recognition, analysis, and tracking system may include a reference plate such as a reference image of the scene that includes, for example, non-motion depth information for each voxel. According to example embodiments, the reference plate may include a minimum world space position of the voxels such as the minimum X-values, Y-values, and depth values for the voxels in the grid determined over a series of frames, a maximum world space position of the voxels such as the maximum X-values, Y-values, and depth values for the voxels in the grid determined over a series of frames, an average world position of the voxels such as the average X-values, Y-values, and depth values for the voxels in the grid determined of a series of frames, or any other suitable reference plate. In another embodiment, the reference plate may include a moving average associated with each voxel in the scene. The moving average may include, for example, an average depth value of a voxel determined over a series of previously received frames.

According to one embodiment, the target recognition, analysis, and tracking system may compare depth information such as a maximum depth value, an average depth value, a minimum depth value, or the like of each voxel associated with the identified objects in the scene of the depth image received at, for example, 305 with the non-motion depth information of each corresponding voxel included in the reference plate. Based on the comparison of the depth information and the non-motion depth information of the corresponding voxel in the reference plate, the target recognition, analysis, and tracking system may identify a voxel as moving. For example, in one embodiment, if a depth value such as the minimum depth value, the maximum depth value, and/or the average depth value of a voxel may be less than the moving average of the corresponding voxel in the reference plate such that the voxel may be in front of the moving average, the voxel may be identified as moving. According to another example embodiment, the target recognition, analysis, and tracking system may calculate a difference between the values associated with the voxel and the corresponding voxel in the reference plate. If, for example, a difference between a depth value such as the average depth value, the maximum depth value, and/or the minimum depth value of a voxel and depth values included in the non-motion information of the corresponding voxel in the reference plate may be greater than a motion threshold, the voxel may be identified by the target recognition, analysis, and tracking system as moving.

In another example embodiment, the target recognition, analysis, and tracking system may compare depth information such as a maximum depth value, an average depth value, a minimum depth value, or the like of a voxel and the voxels adjacent thereto with the non-motion depth information of each corresponding voxel included in the reference plate. For example, to handle edge noise, the target recognition, analysis, and tracking system may compare a minimum depth value of a particular voxel and the voxels that may be adjacent thereto against the corresponding voxel in the reference plate to determine whether a voxel and/or the object associated therewith may be moving. If, for example, a difference between the minimum depth value of the particular voxel and the voxels that may be adjacent thereto and the minimum depth value included in the non-motion information of the corresponding voxels in the reference plate may be greater than a motion threshold, the particular voxel may be identified by the target recognition, analysis, and tracking system as moving.

The target recognition, analysis, and tracking system may then calculate a foreground score for each identified object based on a percentage of moving voxels. In one embodiment, the target recognition, analysis, and tracking system may divide the number of voxels included in the island that may be identified as moving by the total number of voxels included in the island to calculate the foreground score.

The target recognition, analysis, and tracking system may then isolate the object having a foreground score that may exceed a score threshold. The score threshold that may be a value or percentage defined by the target recognition, analysis, and tracking system that may indicate an object may be in motion. For example, the target recognition, analysis, and tracking system may remove or discard the background objects that may not be moving based on the foreground score from the downsampled depth image such that the foreground object such as the human target that may have a foreground score that may exceed the score threshold may be isolated in the downsampled depth image. According to an example embodiment, to remove or discard the objects that may not be moving, the target recognition, analysis, and tracking system may remove or discard the voxels associated with the non-moving objects by replacing the X-values, the Y-values, and/or the depth values with a zero value or another suitable indicator or flag that may indicate the voxel may be invalid.

At 320, one or more extremities such as one or more body parts may be determined for the isolated foreground object such as the human target. For example, in one embodiment, the target recognition, analysis, and tracking system may apply one or more heuristics or rules to the isolated human target to determine, for example, a centroid or center, a head, shoulders, a torso, arms, legs, or the like associated with the isolated human target. According to one embodiment, based on the determination of the extremities, the target recognition, analysis, and tracking system may generate and/or adjust a model of the isolated human target. For example, if the depth image received at 305 may be included in an initial frame observed or captured by a capture device such as the capture device 20 described above with respect to FIGS. 1A-2, a model may be generated based on the location of the extremities such as the centroid, head, shoulders, arms, hands, legs, or the like determined at 320 by, for example, assigning a joint of the skeletal model to the determined locations of the extremities, which will be described in more detail below. Alternatively, if the depth image may be included in a subsequent or non-initial frame observed or captured by the capture device, a model that may have been previously generated may be adjusted based on the location of the extremities such as the centorid, head, shoulders, arms, hands, legs, or the like determined at 320, which will be described in more detail below.

According to an example embodiment, upon isolating the foreground object such as the human target at 315, the target recognition, analysis, and tracking system may calculate an average of the voxels in the human target to, for example, estimate a centroid or center of the human target at 320. For example, the target recognition, analysis, and tracking system may calculate an average position of the voxels included in the human target that may provide an estimate of the centroid or center of the human target. In one embodiment, the target recognition, analysis, and tracking system may calculate the average position of the voxels associated with the human target based on X-values, Y-values, and depth values associated with the voxels. For example, as described above, the target recognition, analysis, and tracking system may calculate an X-value for a voxel by averaging the X-values of the pixels associated with the voxel, a Y-value for the voxel by averaging the Y-values of the pixels associated with the voxel, and a depth value for the voxel by averaging the depth values of the pixels associated with the voxel. At 320, the target recognition, analysis, and tracking system may average the X-values, the Y-values, and the depth values of the voxels included in the human target to calculate the average position that may provide the estimate of the centroid or center of the human target.

Figure 8:
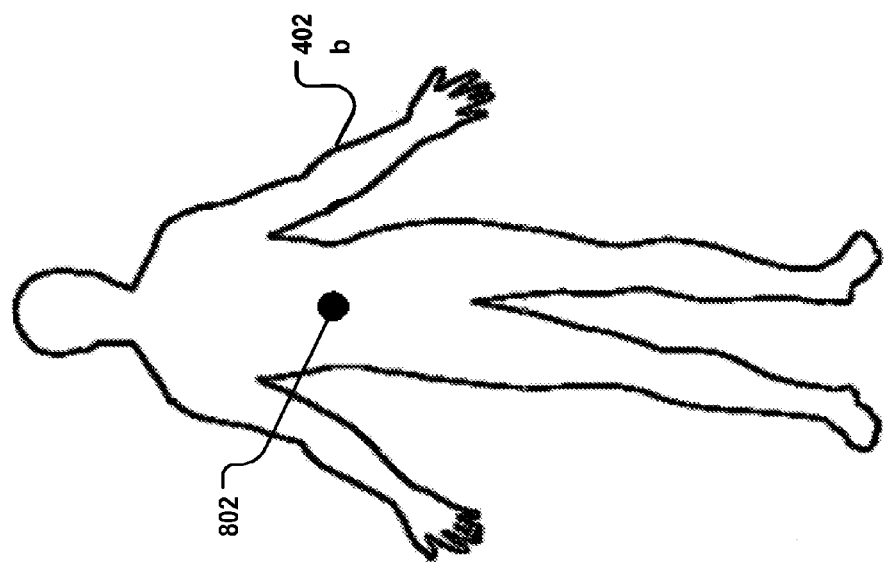
FIG. 8 illustrates an example embodiment of a centroid or center being estimated for a human target.

FIG. 8 illustrates an example embodiment of a centroid or center being estimated for a human target 402b. According to an example embodiment, a location or position 802 of a centroid or center may be based on an average position or location of the voxels associated with the isolated human target 402b as described above.

Referring back to FIG. 5, the target recognition, analysis, and tracking system may then define a bounding box for the human target at 320 to determine, for example, a core volume of the human target that may include the head and/or torso of the human target. For example, upon determining an estimate of the centroid or center of the human target, the target recognition, analysis, and tracking system may search horizontally along the X-direction to determine a width of the human target that may be used to define the bounding box associated with the core volume. According to one embodiment, to search horizontally along the X-direction to measure the width of the human target, the target recognition, analysis, and tracking system may search in a left direction and a right direction along the X-axis from the centroid or center until the target recognition, analysis, and tracking system may reach an invalid voxel such as a voxel that may not include a depth value associated therewith or a voxel that may be associated with another object identified in the scene. For example, as described above, the voxels associated with the background may be removed to isolate the human target and the voxels associated therewith at 315. As described above, according to an example embodiment, to remove the voxels at 315, the target recognition, analysis, and target system may replace the X-values, the Y-values, and/or the depth values associated with the voxels of the background objects with a zero value or another suitable indicator or flag that may indicate the voxel may be invalid. At 320, the target recognition, analysis, and tracking system may search in the left direction from the centroid of the human target until reaching a first invalid voxel at a left side of the human target and may search in the right direction from the centroid of the human target until reaching a second invalid voxel at the right side of the human target. The target recognition, analysis, and tracking system may then calculate or measure the length based on, for example, a difference between the X-values of a first valid voxel adjacent to the first invalid voxel reached in the left direction and a second valid voxel adjacent to the second invalid voxel in the right direction.

The target recognition, analysis, and tracking system may then search vertically along the Y-direction to determine a height of the human target from, for example, the head to the hips that may be used to define the bounding box associated with the core volume. According to one embodiment, to search vertically along the Y-direction to measure the width of the human target, the target recognition, analysis, and tracking system may search in a upward direction and a downward direction along the Y-axis from the centroid or center until the target recognition, analysis, and tracking system reaches an invalid voxel or a voxel that may not include an X-value, a Y-value, or a depth value associated therewith. For example, at 320, the target recognition, analysis, and tracking system may search in the upward direction from the centroid of the human target until reaching a third invalid voxel at a top portion of the human target and may search in the downward direction from the centroid of the human target until reaching a fourth invalid voxel at a bottom portion of the human target. The target recognition, analysis, and tracking system may then calculate or measure the height based on, for example, a difference between the Y-values of a third valid voxel adjacent to the third invalid voxel reached in the upward direction and a fourth valid voxel adjacent to the fourth invalid voxel in the upward direction.

According to an example embodiment, the target recognition, analysis, and tracking system may further search diagonally along the X- and Y-directions on the X- and Y-axis at various angles such as a 30 degree, a 45 degree angle, a 60 degree angle or the like to determine other distances and values that may be used to define the bounding box associated with the core volume.

Additionally, the target recognition, analysis, and tracking system may define the bounding box associated with the core volume based on ratios of distances or values. For example, in one embodiment, the target recognition, analysis, and tracking system may define a width of the bounding box based on the height determined as described above multiplied by a constant variable such as 0.2, 0.25, 0.3 or any other suitable value.

The target recognition, analysis, and tracking system may then define a bounding box that may represent the core volume based on the first and second valid voxels determined by the horizontal search along the X-axis, the third and fourth valid voxels determined by the vertical search along the along the Y-axis, or other distances and values determined by, for example diagonal searches. For example, in one embodiment, the target recognition, analysis, and tracking system may generate a first vertical line of the bounding box along the Y-axis at the X-value of the first valid voxel and a second vertical line of the bounding box along the Y-axis at the X-value of the second valid voxel. Additionally, the target recognition, analysis, and tracking system may generate a first horizontal line of the bounding box along the X-axis at the Y-value of the third valid voxel and a second horizontal line of the bounding box along the X-axis at the Y-value of the fourth valid voxel. According to an example embodiment, the first and second horizontal lines may intersect the first and second vertical lines to form a rectangular or square shape that may represent the bounding box associated with the core volume of the human target.

Figure 9:
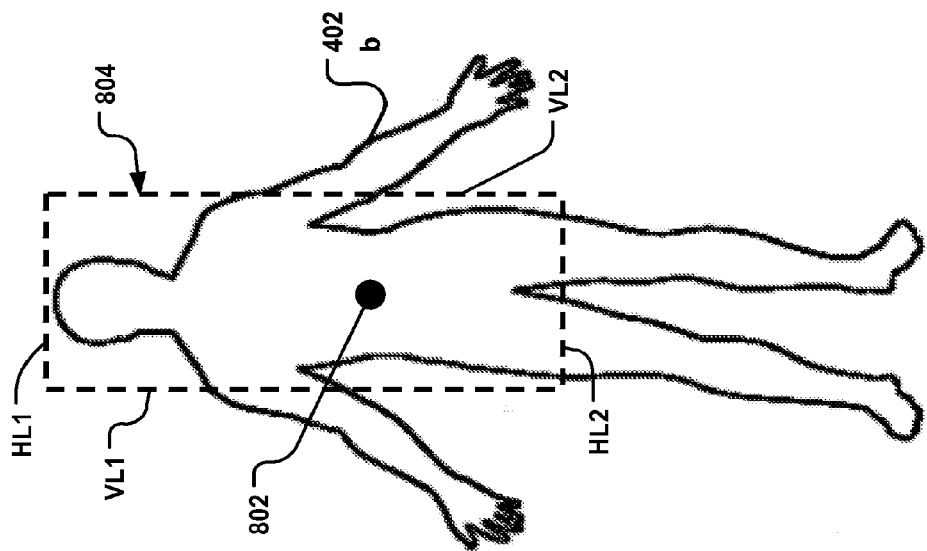
FIG. 9 illustrates an example embodiment of a bounding box that may be defined to determine a core volume.

FIG. 9 illustrates an example embodiment of a bounding box 804 that may be defined to determine a core volume. As shown in FIG. 9, the bounding box 804 may form a rectangular shape based on the intersection of a first vertical line VL1 and a second vertical line VL2 with a first horizontal line HL1 and a second horizontal line HL2 determined as described above.

Referring back to FIG. 5, the target recognition, analysis, and tracking system may then determine a head of the human target at 320. For example, in one embodiment, after determining the core volume and defining the bounding box associated therewith, the target recognition, analysis, and tracking system may determine a location or position of the head of the human target.

To determine the position or location of the head, the target recognition, analysis, and tracking system may search for various candidates at positions or locations suitable for the head, may score the various candidates, and may then select the position of head from the various candidates based on the scores. For example, according to one embodiment, the target recognition, analysis, and tracking system may search for an absolute highest voxel of the human target and/or voxels adjacent to or near the absolute highest voxel, one or more incremental voxels based on the location of the head determined for a previous frame, a highest voxel on an upward vector that may extend vertically from, for example, the centroid or center and/or voxels adjacent or near the highest voxel on a previous upward vector determined for a previous frame, a highest voxel on a previous upward vector between a center and a highest voxel determined for a previous frame, or any other suitable voxels that may be a candidate for the head.

The target recognition, analysis, and tracking system may then score the candidates. According to one embodiment, the candidates may be scored based 3-D pattern matching. For example, the target recognition, analysis, and tracking system may create a head cylinder and a shoulder cylinder. The target recognition, analysis, and tracking system may then calculate a score for the candidates based on the number of voxels associated with the candidates that may included in the head cylinder, which will be described in more detail below.

Figure 10:
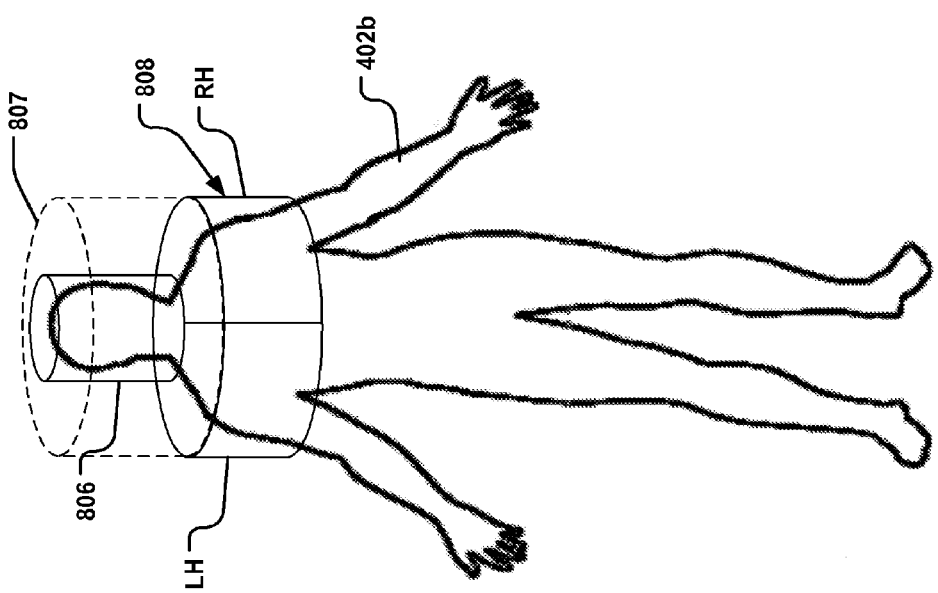
FIG. 10 illustrates an example embodiment of a head cylinder and a torso cylinder that may be created to score a head candidate.

FIG. 10 illustrates an example embodiment of a head cylinder 806 and a shoulder 808 that may be created to score candidates associated with the head. According to an example embodiment, the target recognition, analysis, and tracking system may calculate a score for the candidates based on the number of voxels associated with the head candidates included in the head cylinder 806 and the shoulder cylinder 808. For example, the target recognition, analysis, and tracking system may determine the total number head candidates inside the head cylinder 806 and/or the shoulder cylinder 808 based on the location of the voxels associated with the head candidates and a total number of the head candidates outside the head cylinder 806 (e.g., within an area 807) and/or the shoulder cylinder 808 based on the voxels associated with the head candidates. The target recognition, analysis, and tracking system may further calculate a symmetric metric based on a function of an absolute value of a difference between the number of the head candidates in a left half LH of the shoulder cylinder 808 and the number of head candidates in a right half RH of the shoulder cylinder 808. In an example embodiment, the target recognition, analysis, and tracking system may then calculate the score for the candidates by subtracting the total number of candidates outside the head cylinder 806 and/or the shoulder cylinder 808 from the total number of candidates inside the head cylinder 806 and/or the shoulder cylinder 808 and further subtracting the symmetric metric from the difference between the total number of candidates inside and outside the head cylinder 806 and/or shoulder cylinder 808. According to one embodiment, the target, recognition, analysis, and tracking system may multiple the total number of candidates inside and outside the head cylinder 806 and/or the shoulder cylinder 808 by a constant determined by the target recognition, analysis, and tracking system before subtracting.

Referring back to FIG. 5, according to one embodiment, if a score associated with one of the candidate exceeds a head threshold score, the target recognition, analysis, and tracking system may determine a position or location of the head based on the voxels associated with the candidate at 320. For example, in one embodiment, the target recognition, analysis, and tracking system may select a position or location of the head based on the highest point, the highest voxel on an upward vector that may extend vertically from, for example, the centroid or center and/or voxels adjacent or near the highest voxel on a previous upward vector determined for a previous frame, the highest voxel on a previous upward vector between a center and a highest voxel determined for a previous frame, an average position of all the voxels within an area such as a box, cube, or the like around a position or location of the head in a previous frame, or the like. According to other example embodiments, the target recognition, analysis, and tracking system may calculate an average of the values such as the X-values, Y-values, and depth values for the voxels associated with the candidate that may exceed the head threshold score to determine the position or location of the head or the target recognition, analysis, and tracking system may select a position or location of the head based on a line fit or a line of best fit of the voxels included in the candidate that may exceed the head threshold score.

Additionally, in one embodiment, if more than one candidate exceeds the head threshold score, the target recognition, analysis, and tracking system may select the candidate that may have the highest score and may then determine the position or location of the head based on the voxels associated with the candidate that may have the highest score. As described above, the target, recognition, analysis, and tracking system may select a position or location of the head based on, for example, an average the values such as the X-values, Y-values, and depth values for the voxels associated with the candidate that may have the highest score.

According to one embodiment, if none of the scores associated with the candidates exceeds the head threshold score, the target recognition, analysis, and tracking system may use a previous position or location of the head determined for voxels included in a human target associated with a depth image of a previous frame in which the head score may have exceed the head threshold score or the target recognition, analysis, and tracking system may use a default position or location for a head in a default pose of a human target such as a T-pose, a natural standing pose or the like, if the depth image received at 305 may be in an initial frame captured or observed by the capture device.

According to another embodiment, the target recognition, analysis, and tracking system may include one or more two-dimensional (2-D) patterns associated with, for example, a head shape. The target recognition, analysis, and tracking system may then score the candidates associated with a head based on a likelihood that the voxels associated with the candidate may be a head shape of the one or more 2-D patterns. For example, the target recognition, analysis, and tracking system may sample the depths values of adjacent or nearby voxels that may be indicative of defining a head shape.

If a sampled depths value of one of the voxels that may be indicative of defining a head shape may deviate from one or more expected or predefined depth values of the voxels of the head shape, the target recognition, analysis, and tracking system may reduce a default score or an initial score to indicate that the voxel may not be the head. In one embodiment, the target recognition, analysis, and tracking system may then select the score having the highest value and may assign a location or position of the head based on the location or position of the voxel associated with the candidate having the highest score.

According to another embodiment, the default score or the initial score may be the score for the candidates associated with the head calculated using the head and/or shoulder cylinder as described above. The target recognition, analysis, and tracking system may reduce such the score if the candidate may not be in a head shape associated with the one or more the 2-D patterns. As described above, the target recognition, analysis, and tracking system may then select the score of the candidate that exceeds a head threshold score and may assign a location or position of the head based on the location or position of the candidate.

The target recognition, analysis, and tracking system may further determine the shoulders and hips of the human target at 320. For example, in one embodiment, after determining the location or position of the head of the human target, the target recognition, analysis, and tracking system may determine a location or a position of the shoulders and the of the human target. The target recognition, analysis, and tracking system may also determine an orientation of the shoulders and the hips such as a rotation or angle of the shoulders and the hips.

According to an example embodiment, to determine a location or a position of the shoulders and the hips, the target recognition, analysis, and tracking system may define a head-to-center vector based on the location or position of the head and the centroid or center of the human target. For example, the head-to-center vector may be a vector or line defined between the X-value, the Y-value, and the depth value (or Z-value) of the location or position of the head point and the X-value, the Y-value, and the depth value (or Z-value) of the location or position of the centroid or center point.

Figure 11:
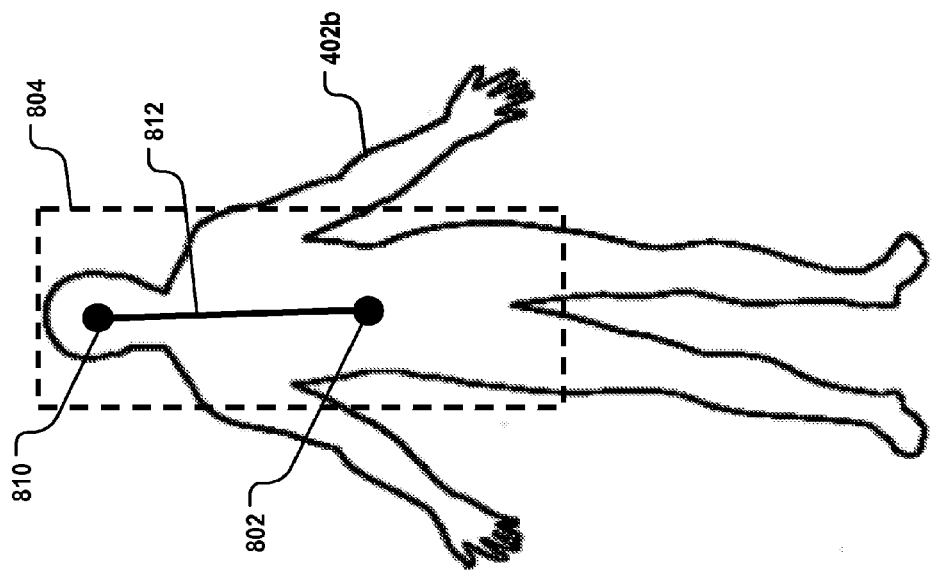
FIG. 11 illustrates an example embodiment of a head-to-center vector based on a head and a centroid or center of a human target.

FIG. 11 illustrates an example embodiment of a head-to-center vector based on a head and a centroid or center of a human target. As described above, a location or a position such as the location or position 810 of the head may be determined. As shown in FIG. 11, the target recognition, analysis, and tracking system may then define a head-to-center vector 812 between the location or position 810 of the head and the location or position 802 of the center or centroid.

Referring back to FIG. 5, the target recognition, analysis, and tracking system may then define a shoulder volume box and a hips volume box based on the head-to-center vector at 320. For example, according to one embodiment, the target recognition, analysis, and tracking system may define or determine an approximate location or position of the shoulders and the hips based on a displacement such as a length from a body landmark such as the position or location associated with the head or the centroid or center. The target recognition, analysis, and tracking system may then define the shoulder volume box and the hips volume box around the displacement value from the body landmark such as the position or location associated with the head or the centroid or center.

FIG. 12 illustrates an example embodiment of a shoulders volume box SVB and a hips volume box HVB determined based on a head-to-center vector 812. According to an example embodiment, the target recognition, analysis, and tracking system may define or determine an approximate location or position of the shoulders and the hips based on a displacement such as a length from a body landmark such as the location or position 810 associated with the head or the location or position 802 associated with the centroid or center. The target recognition, analysis, and tracking system may then define the shoulder volume box SVB and the hips volume box HVB around the displacement value from the body landmark.

Referring back to FIG. 5, the target recognition, analysis, and tracking system may further calculate the center of the shoulders and the hips based on the displacement value such as the length from the body landmark such as the head along the head-to-center vector at 320. For example, the target recognition, analysis, and tracking system may move down or up along the head-to-center vector by the displacement value to calculate the center of the shoulders and the hips.

According to one embodiment, the target recognition, analysis, and tracking system may also determine an orientation such as an angle of the shoulders and the hips. In one embodiment, the target recognition, analysis, and tracking system may calculate a line fit of the depth values within, for example, the shoulders volume box and the hips volume box to determine the orientation such as the angle of the shoulders and hips. For example the target recognition, analysis, and tracking system may calculate a line of best fit based on the X-values, Y-values, and depth values of the voxels associated with the shoulders volume box and the hips volume box to calculate a shoulders slope of a vector that may define a shoulders bone through the center of the shoulders and a hips slope of a vector that may define a hips bone between joints of the hips through the center of the hips. The shoulders slope and the hips slope may define the respective orientation such as the angle of the shoulders and the hips.

According to another embodiment, the target recognition, analysis, and tracking system may mirror the depth values of the human target such that the depth values of the voxels may be reflected around the center of the human target based on the head-to-center vector at 320. Thus, in one embodiment, the target recognition, analysis, and tracking system may compensate for the back of the body by reflecting the depth values of the voxels of the human target around a pivot vector such as the head-to center-vector, a pivot point computed from the shoulders and/or the hips bounding boxes, or the like.

The target recognition, analysis, and tracking system may then calculate the line fit of the depth values including the reflected depth values within, for example, the shoulders volume box and the hips volume box to determine the orientation such as the angle of the shoulders and hips. For example, the target recognition, analysis, and tracking system may calculate a line of best fit based on the X-values, Y-values, and depth values of the voxels including the reflected depth values associated with the shoulders volume box and the hips volume box to calculate a shoulders slope of a vector that may define a shoulders bone through the center of the shoulders and a hips slope of a vector that may define a hips bone between joints of the hips through the center of the hips. The shoulders slope and the hips slope may define the respective orientation such as the angle of the shoulders and the hips.

FIG. 13 illustrates an example embodiment of shoulders and hips that may be calculated based on the shoulders volume box SVB and the hips volume box HVB. As shown in FIG. 13, a location or position 816*a-b* of the shoulders and a location or position 818*a-b* of the hips may be determined as described above based on the respective shoulders volume box SVB and the hips volume box HVB.

Referring back to FIG. 5, at 320, the target recognition, analysis, and tracking system may then determine the torso of the human target. In one embodiment, after determining the shoulders and the hips, the target recognition, analysis, and tracking system may generate or create a torso volume that may include the voxel associated with and surrounding the head, the shoulders, the center, and the hips. The torso volume may be a cylinder, a pill shape such as a cylinder with rounded ends, or the like based on the location or position of the center, the head, the shoulders, and/or the hips.

According to one embodiment, the target recognition, analysis, and tracking system may create a cylinder that may represent the core volume having dimensions based on the shoulders, the head, the hips, the center, or the like. For example, the target recognition, analysis, and tracking system may create a cylinder that may have a width or a diameter based on the width of the shoulders and a height based on the distance between the head and the hips. The target recognition, analysis, and tracking system may then orient or angle the cylinder that may represent the torso volume along the head-to-center vector such that the torso volume may reflect the orientation such as the angle of the torso of the human target.

Figure 14:
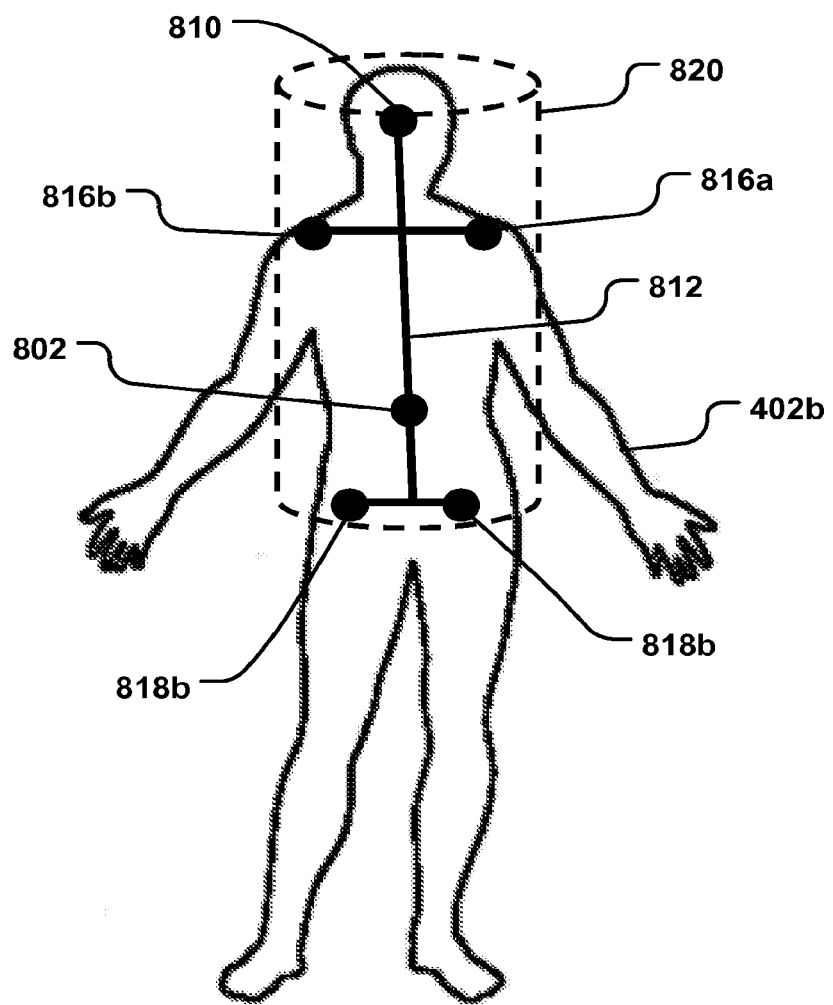
FIG. 14 illustrates an example embodiment of a cylinder that may represent the core volume.

FIG. 14 illustrates an example embodiment of a cylinder 820 that may represent the core volume. As shown in FIG. 14, the cylinder 820 may have a width or a diameter based on the width of the shoulders and a height based on the distance between the head and the hips. The cylinder 820 may also be oriented or angled along the head-to-center vector 812.

Referring back to FIG. 5, at 320, the target recognition, analysis, and tracking system may then estimate or determine the limbs of the human target. According to one embodiment, after generating or creating the torso volume, the target recognition, analysis, and tracking system may coarsely label voxels outside the torso volume as a limb. For example, the target recognition, analysis, and tracking system may identify each of the voxels outside of the torso volume such that the target recognition, analysis, and tracking system may label the voxels as being part of a limb.

The target recognition, analysis, and tracking system may then determine the actual limbs such as a right and left arm, a right and left hand, a right and left leg, a right and left foot, or the like associated with the voxels outside of the torso volume. In one embodiment, to determine the actual limbs, the target recognition, analysis, and tracking system may compare a previous position or location of an identified limb such as the previous position or location of the right arm, left arm, left leg, right leg, or the like with the position or location of the voxels outside of the torso volume. According to example embodiments, the previous location or position of the previously identified limbs may be a location or position of a limb in a depth image received in a previous frame, a projected body part location or position based on a previous movement, or any other suitable previous location or position of a representation of a human target such as a fully articulated skeleton or volumetric model of the human target. Based on the comparison, the target recognition, analysis, and tracking system may then associate the voxels outside of the torso volume with the closest previously identified limbs. For example, the target recognition, analysis, and tracking system may compare the position or location including the X-value, Y-value, and depth value of each of the voxels outside of the torso volume with the previous positions or locations including the X-values, Y-values, and depth values of the previously identified limbs such as the previously identified left arm, right arm, left leg, right leg, or the like. The target recognition, analysis, and tracking system may then associate each of the voxels outside the torso volume with the previously identified limb that may have the closest location or position based on the comparison.

In one embodiment, to determine the actual limbs, the target recognition, analysis, and tracking system may compare a default position or location of an identified limb such as the right arm, left arm, right leg, left leg, or the like in a default pose of a representation of a human target with the position or location of the voxels outside of the torso volume. For example, the depth image received at 305 may be included in an initial frame captured or observed by the capture device. If the depth image received at 305 may be included in an initial frame, the target recognition, analysis, and tracking may compare a default position or location of a limb such as the default position or location of a right arm, left arm, left leg, right leg, or the like with the position or location of the voxels outside of the torso volume. According to example embodiments, the default location or position of the identified limbs may be a location or position of a limb in a default pose such as a T-pose, a Di Vinci pose, a natural pose, or the like of a representation of a human target such as a fully articulated skeleton or volumetric model of the human target in the default pose. Based on the comparison, the target recognition, analysis, and tracking system may then associate the voxels outside of the torso volume with the closest limb associated with the default pose. For example, the target recognition, analysis, and tracking system may compare the position or location including the X-value, Y-value, and depth value of each of the voxels outside of the torso volume with the default positions or locations including the X-values, Y-values, and depth values of the default limbs such as the default left arm, right arm, left leg, right leg, or the like. The target recognition, analysis, and tracking system may then associate each of the voxels outside the torso volume with the default limb that may have the closest location or position based on the comparison.

The target recognition, analysis, and tracking system may also re-label voxels within the torso volume based on the estimated limbs. For example, in one embodiment, at least a portion of an arm such as a left forearm may be positioned in front of the torso of the human target. Based on the previous position or location of the identified arm, the target recognition, analysis, and tracking system may determine or estimate the portion as being associated with the arm as described above. For example, the previous position or location of the previously identified limb may indicate that the one or more voxels of a limb such as an arm of the human target may be within the torso volume. The target recognition, analysis, and tracking system may then compare the previous positions or locations including the X-values, Y-values, and depth values of the previously identified limbs such as the previously identified left arm, right arm, left leg, right leg, or the like with the position or location of voxels included in the torso volume. The target recognition, analysis, and tracking system may then associate and relabel each of the voxels inside the torso volume with the previously identified limb that may have the closest location or position based on the comparison.

According to one embodiment, after labeling the voxels associated with the limbs, the target recognition, analysis, and tracking system may determine the location or position of, for example, portions of the labeled limbs at 320. For example, after labeling the voxels associated with the left arm, the right arm, the left leg, and/or the right leg, the target recognition may determine the location or position of the hands and/or the elbows of the right and left arms, the knees and/or the feet, the elbows, or the like.

The target recognition, analysis, and tracking system may determine the location or position of the portions such as the hands, elbows, feet, knees, or the like based on limb averages for each of the limbs. For example, the target recognition, analysis, and tracking system may calculate a left arm average location by adding the X-values for each of the voxels of the associated with the left arm, the Y-values for each of the voxels associated with the left arm, and the depth values for each of the voxels associated with the left arm and dividing the sum of each of the X-values, Y-values, and depth values added together by the total number of voxels associated with the left arm. According to one embodiment, the target recognition, analysis, and tracking system may then define a vector or a line between the left shoulder and the left arm average location such that the vector or the line between the left shoulder and the left arm average location may define a first search direction for the left hand. The target recognition, analysis, and tracking system may then search from the shoulders to along the first search direction defined by the vector or the line for the last valid voxel or last voxel having a valid X-value, Y-value, and/or depth value and may associate the location or position of the last valid voxel with the left hand.

According to another embodiment, the target recognition, analysis, and tracking system may calculate an anchor point. The target recognition, analysis, and tracking system may then define a vector or a line between the anchor point and the left arm average location such that the vector or the line between the anchor point and the left arm average location may define a second search direction for the left hand. The target recognition, analysis, and tracking system may then search from the anchor point along the second search direction defined by the vector or the line for the last valid voxel or last voxel having a valid X-value, Y-value, and/or depth value and may associate the location or position of the last valid voxel with the left hand.

In an example embodiment, the target recognition, analysis, and tracking system may calculate the location or position of the anchor point based on one or more offsets from other determined extremities such as the head, hips, shoulders, or the like. For example, the target recognition, analysis, and tracking system may calculate the X-value and the depth value for the anchor point by extending the location or position of the shoulder in the respective X-direction and Z-direction by half of the X-value and depth value associated with the location or position of the shoulder. The target recognition, analysis, and tracking system may then mirror the location or position of the X-value and the depth value for the anchor point around the extended locations or positions.

The target recognition, analysis, and tracking system may calculate the Y-value for the anchor point based on a displacement of the left arm average location from the head and/or the hips. For example, the target recognition, analysis, and tracking system may calculate the displacement or the difference between the Y-value of the head and the Y-value of the left arm average. The target recognition, analysis, and tracking system may then add the displacement or difference to the Y-value of, for example, the center of the hips to calculate the Y-value of the anchor point.

FIGS. 15A-15C illustrate example embodiments of a hand being determined based on anchor points 828a-828c. As shown in FIGS. 15A-15C, according to another embodiment, the target recognition, analysis, and tracking system may calculate anchor points 828a-828c. The target recognition, analysis, and tracking system may then define a vector or a line between the anchor points 828a-828c and the left arm average locations 826a-826c such that the vector or the line between the anchor point and the left arm average location may define a second search direction for the left hand. The target recognition, analysis, and tracking system may then search from the anchor points 828a-828c along the second search direction defined by the vector or the line for the last valid voxel or last voxel having a valid X-value, Y-value, and/or depth value and may associate the location or position of the last valid voxel with the left hand.

As described above, in an example embodiment, the target recognition, analysis, and tracking system may calculate the location or position of the anchor points 828a-828c based on one or more offsets from other determined extremities such as the head, hips, shoulders, or the like as described above. For example, the target recognition, analysis, and tracking system may calculate the X-value and the depth value for the anchor points 828a-828c by extending the location or position of the shoulder in the respective X-direction and Z-direction by half of the X-value and depth value associated with the location or position of the shoulder. The target recognition, analysis, and tracking system may then mirror the location or position of the X-value and the depth value for the anchor points 828a-828c around the extended locations or positions.

The target recognition, analysis, and tracking system may calculate the Y-value for the anchor points 828a-828c based on a displacement of the left arm average location from the head and/or the hips. For example, the target recognition, analysis, and tracking system may calculate the displacement or the difference between the Y-value of the head and the Y-value of the left arm averages 826a-826c. The target recognition, analysis, and tracking system may then add the displacement or difference to the Y-value of, for example, the center of the hips to calculate the Y-value of the anchor point 828a-828c.

Referring back to FIG. 5, according to an example embodiment, the target recognition, analysis, and tracking system may calculate a right arm average location that may be used to define a search direction such as a first and second search direction as described above that may be used to determine a location or position of a right hand at 320. The target recognition, analysis, and tracking system may further calculate a left leg average location and a right leg average location that may be used to define to a search direction as described above that may be used to determine a left foot and a right foot.

Figure 16:
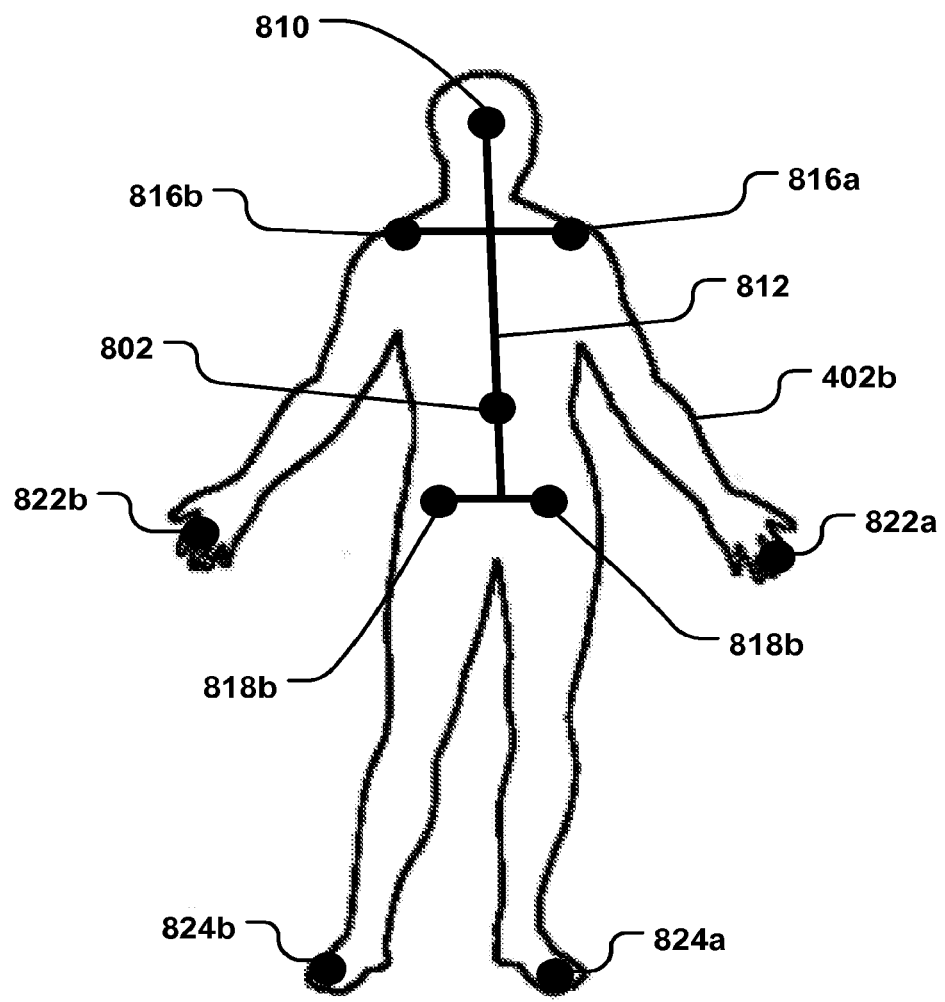
FIG. 16 illustrates an example embodiment of hands and feet that may be calculated based on arm and leg average positions and/or anchor points.

FIG. 16 illustrates an example embodiment of hands and feet that may be calculated based on arm and leg average positions and/or anchor points. As shown in FIG. 16, a location or position 822a-b of the hands and a location or position 824a-b of the feet that may be determined based on the first and second search directions determined by the respective arm and leg average positions and/or the anchor points as described above.

Referring back to FIG. 6, at 320, the target recognition, analysis, and tracking system may also determine a location or a position of elbows and knees based on the right and left arm average locations and the right and the left leg average locations, the shoulders, the hips, the head, or the like. In one embodiment, the target recognition, analysis, and tracking system may determine the location position of the left elbow by refining the X-value, the Y-value, and the depth value of the left arm average location. For example, the target recognition, analysis, and tracking system may determine the outermost voxels that may define edges associated with the left arm. The target recognition, analysis, and tracking system may then adjust X-value, the Y-value, and the depth value of the left arm average location to be to be in the middle or equidistance from the edges.

The target recognition, analysis, and tracking system may further determine additional points of interest for the isolated human target at 320. For example, the target recognition, analysis, and tracking system may determine the farthest voxel away from the center of the body, the closest voxel to the camera, the most forward voxel of the human target based on the orientation such as the angle of, for example, the shoulders.

The target recognition, analysis, and tracking system may then determine whether one or more of the locations or positions determined for the extremities such as the head, the shoulders, the hips, the hands, the feet, or the like may not have been accurate locations or positions for the actual extremities of the human target at 320. For example, in one embodiment, the location or position of the right hand may be inaccurate such that the location or position of the right hand may be stuck on or adjacent to the location or position of the shoulder or the hip.

According to an example embodiment, the target recognition, analysis, and tracking system may include or store a list of volume markers for the various extremities that may indicate inaccurate locations or position of the extremities. For example, the list may include volume markers around the shoulders and the hips that may be associated with the hands. The target recognition, analysis, and tracking system may determine whether the location or position for the hands may be accurate based on the volume markers associated with the hands in the list. For example, if the location or position of a hand may be within one of the volume markers associated with the hand in the list, the target recognition, analysis, and tracking system may determine that the location or position of the hand may be inaccurate. According to one embodiment, the target recognition, analysis, and tracking system may then adjust the location or position of the hand to the previous accurate location of the hand in a previous frame to the current location or position of the hand.

At 325, the target recognition, analysis, and tracking system may track a model that may be generated based on the extremities determined at 320. For example, the target recognition, analysis, and tracking system may generate and/or may include a model such as a skeletal model that may have one or more joints and bones defined therebetween.

Figure 17:
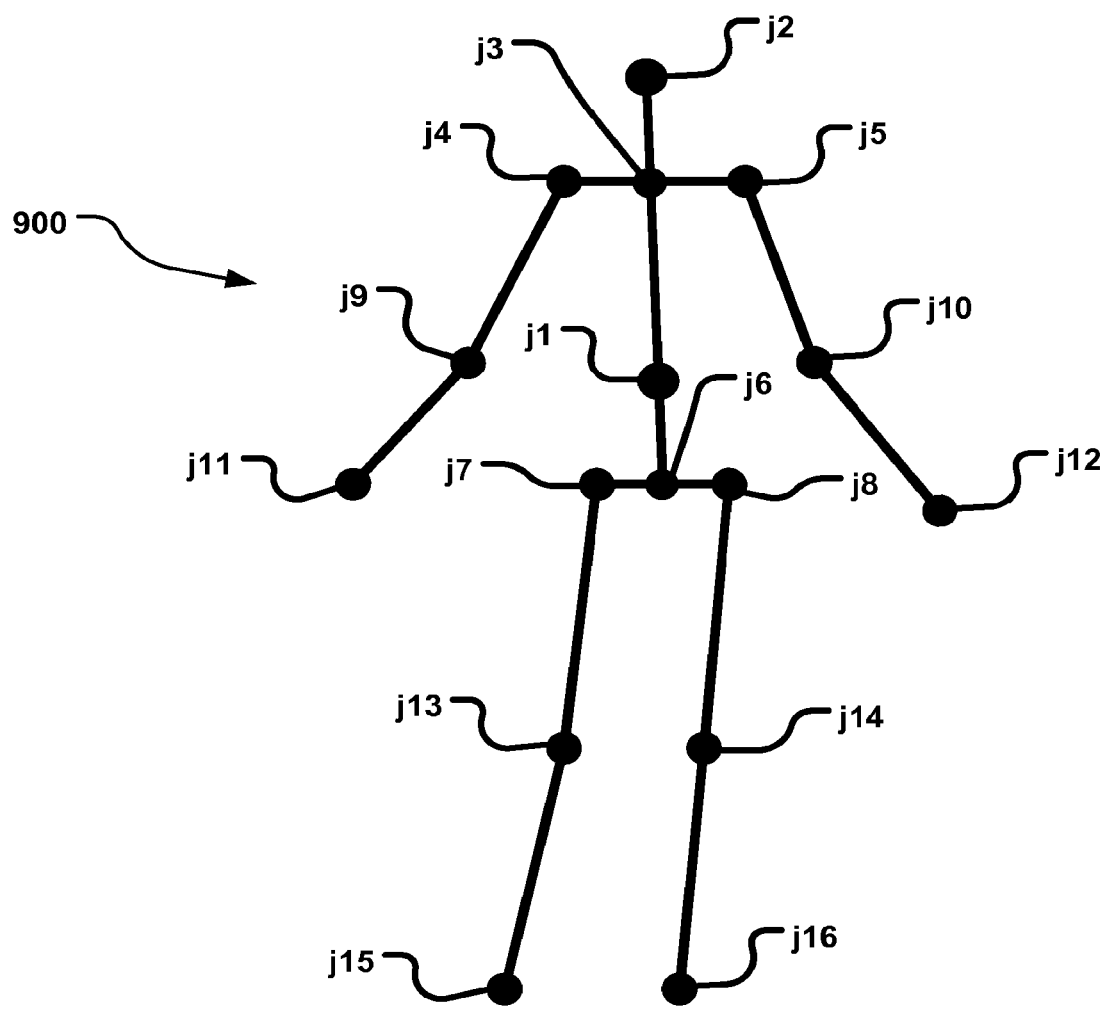
FIG. 17 illustrates an example embodiment a model that may be generated.

FIG. 17 illustrates an example embodiment a model 900 such as a skeletal model that may be generated. According to an example embodiment, the model 900 may include one or more data structures that may represent, for example, a three-dimensional model of a human. Each body part may be characterized as a mathematical vector having X, Y, and Z values that may define joints and bones of the model 900.

As shown in FIG. 17, the model 900 may include one or more joints j1-j16. According to an example embodiment, each of the joints j1-j16 may enable one or more body parts defined there between to move relative to one or more other body parts. For example, a model representing a human target may include a plurality of rigid and/or deformable body parts that may be defined by one or more structural members such as "bones" with the joints j1-j16 located at the intersection of adjacent bones. The joints j1-16 may enable various body parts associated with the bones and joints j1-j16 to move independently of each other. For example, the bone defined between the joints j10 and j12, shown in FIG. 17, corresponds to a forearm that may be moved independent of, for example, the bone defined between joints j14 and j16 that corresponds to a calf.

Referring back to FIG. 5, at 325, the target recognition, analysis, and tracking system may adjust the generated model based on the location or positions determined for the extremities at 320. For example, the target recognition, analysis, and tracking system may adjust the joint j1 associated with the head to correspond the position or location such as the location or position 810 for the head determined at 320. Thus, in an example embodiment, the joint j1 may be assigned the X-value, the Y-value, and the depth value associated with the location or position 810 determined for the head as described above. If one or more of the extremities may be inaccurate based on, for example, the list of volume markers described above, the target recognition, analysis, and tracking system may keep the inaccurate joints in their previous location or position based on a previous frame.

Additionally, if the target recognition, analysis, and tracking system may not have locations or positions of the extremities, the target recognition, analysis, and tracking system may use a default location or position based on a default pose such as a T-pose, Di Vinci pose, or the like. For example, the target recognition, analysis, and tracking system may magnetize or adjust one or more of the joints j1-j16 of the model to be associated the X-value, the Y-value, and/or the depth value of the closest voxels in the default pose.

At 325, the target recognition, analysis, and tracking system may also adjust the measurements of one or more of the bones defined between the joints of the model based on one or more body measurements determined at 330, which will be described in more detail below. For example, the target recognition, analysis, and tracking system may determine the length of the left forearm of the human target at 330. At 325, the target recognition, analysis, and tracking system may then adjust the length of the bone associated with the left forearm to mimic the length of the left forearm determined for the human target at 330. For example, the target recognition, analysis, and tracking system may adjust one or more of the X-values, Y-values, and depth values (or Z-values) of the joints j10 and j12 such that the bone defined therebetween may be equal to the length determined for the left forearm of the human target at 330.

At 325, the target recognition, analysis, and tracking system may further check for invalid locations or positions of the joints associated with the adjusted model being. For example, in one embodiment, the target recognition, analysis, and tracking system may check to determine whether a joint such as the joint j10 may be poking out such that the model may be stuck in a chicken dance pose. Thus, at 325, the target recognition, analysis, and tracking system may check the model for known locations or positions where the model may collapse in an inappropriate manner such as the joints associated with the elbows.

According to one embodiment, the target recognition, analysis, and tracking system may further refine a location or position of a joint based on X-values, Y-values, and depth values in the 2-D pixel area of the non-downsampled depth image received at 305. For example, in one embodiment, the target recognition, analysis, and tracking system may use the data from the non-downsampled depth image to refine the location or position of the joints of the model where, for example, the model may collapse.

Additionally, the target recognition, analysis, and tracking system may use the data from the now-downsampled depth image to refine the location or position of the joints of the model associated with frequently used gestures. For example, according to one embodiment, the target recognition, analysis, and tracking system may prioritize the joints associated with the hands. The target recognition, analysis, and tracking system may localize the data around the hand in the non-downsampled depth image received at 305 such that the target recognition, analysis, and tracking system may modify the location or position of the hands determined at 320 using the higher resolution data in the non-downsampled depth image received at 305.

As described above, at 330, the target recognition, analysis, and tracking system may scan the voxels associated with the isolated human target to determine the dimensions of the extremities associated therewith. For example, the isolated human target may be scanned to determine, for example, measurements such as lengths, widths, or the like associated with the extremities such as the arms, legs, head, shoulders, hips, torso, or the like.

To determine the dimensions, at 330, the target recognition, analysis, and tracking system may generate an estimator of proposed joint dimensions for each of the extremities. The target recognition, analysis, and tracking system may calculate a mean and a standard deviation for each of the proposed joint dimensions using the estimators. The target recognition, analysis, and tracking system may add the proposed joint dimensions within a defined percentage deviation and the outliers or the proposed joint dimensions outside the defined percentage deviation may be rejected. The target recognition, analysis, and tracking system may then determine the dimensions of the extremities based on the estimator that may have a highest ratio between the standard deviation thereof and the number of the proposed joint dimensions.

The dimensions associated with the extremities determined by the scan may also be updated at 330. According to one embodiment, the target recognition, analysis, and tracking system may include one or more heuristics or rules to determine whether the dimensions determined by the scan may be correct. For example, the target recognition, analysis, and tracking system may include a heuristic or rule that may determine whether the Euclidean distance between symmetrical joints may be roughly equivalent, a heuristic or rule that may determine whether the hands and/or elbows near the body, a heuristic and/or rule that may determine whether the head may be locked in a position or location, a heuristic and/or rule that may determine whether the hands close to the head, or the like that may be used to adjust the dimensions. As described above, the dimensions determined at 330 may be used to adjust the model that may be tracked for a subsequent frame at 325.

At 335, the adjusted model may be processed. For example, in one embodiment, the target recognition, analysis, and tracking system may process the adjusted model by, for example, mapping one or more motions or movements applied to the adjusted model to an avatar or game character such that the avatar or game character may be animated to mimic the user such as the user 18 described above with respect to FIGS. 1A and 1B. For example, the visual appearance of an on-screen character may then be changed in response to changes to the model being adjusted.

In one embodiment, the adjusted model may process the adjusted model by providing the adjusted model to a gestures library in a computing environment such as the computing environment 12 described above with respect to FIGS. 1A-4. The gestures library may be used to determine controls to perform within an application based on positions of various body parts in the skeletal model.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

What is claimed:

1. A method for tracking a user, the method comprising:
   receiving a depth image;
   generating a first voxel of a plurality of voxels based on at least one pixel of the depth image that corresponds to a background independent of at least one pixel that corresponds to a human target, the first voxel overlapping another voxel in the plurality of voxels;
   removing the first voxel from the plurality of voxels to isolate one or more voxels associated with the human target;
   determining a location or position of one or more extremities of the human target based on the one or more voxels associated with the human target; and
   adjusting a model based on the location or position of the one or more extremities.

2. The method of claim 1, wherein the model comprises a skeletal model having joints and bones.

3. The method of claim 1, wherein removing the first voxel from the plurality of voxels to isolate one or more voxels associated with the human target comprises:
   determining whether an object that is associated with the first voxel is in motion; and
   discarding the first voxel in response to determining that the object is not in motion.

4. The method of claim 1, further comprising:
   determining dimensions of the one or more extremities, and adjusting at least one joint or bone of the model based on the determined dimensions.

5. The method of claim 1, wherein the one or more extremities comprises: a head, a centroid, a shoulder, a hip, a leg, an arm, a hand, an elbow, a knee, or a foot.

6. The method of claim 1, further comprising:
   processing the adjusted model.

7. The method of claim 1, wherein each of the voxels in the plurality of voxels is generated based on a portion or block of pixels included in the received depth image.

8. The method of claim 1, wherein generating the first voxel of a plurality of voxels comprises:
   determining that at least one pixel of a plurality of pixels that are downsampled to generate the first voxel of the plurality of voxels has a valid depth value;
   determining that at least one pixel of the plurality of pixels has an invalid depth value; and
   generating the first voxel based on the at least one pixel with the valid depth value without using the at least one pixel with the invalid depth value.

9. The method of claim 1, wherein adjusting the model based on the location or position of the one or more extremities comprises:
   refining a location of position of the model based on the human target as it appears in the depth image.

10. A computer-readable storage device bearing computer-readable instructions that, when executed on a computer, cause the computer to perform operations comprising:
    receiving a depth image;
    generating a first voxel of a plurality of voxels based on at least one pixel of the depth image that corresponds to a background independent of at least one pixel that corresponds to a human target, the first voxel overlapping another voxel in the plurality of voxels;
    removing the first voxel from the plurality of voxels to isolate one or more voxels associated with the human target;
    determining a location or position of one or more extremities of the human target based on the one or more voxels associated with the human target; and
    adjusting a model based on the location or position of the one or more extremities.

11. The computer-readable storage device of claim 10, wherein adjusting a model based on the location or position of the one or more extremities comprises:
    assigning the location or position of the one or more extremities to a corresponding joint of the model.

12. The computer-readable storage device of claim 10, further bearing computer-readable instructions that, when executed on a computer, cause the computer to perform operations comprising:
    determining dimensions of the one or more extremities; and
    adjusting at least one joint or bone of the model based on the determined dimensions.

13. The computer-readable storage device of claim 10, wherein the one or more extremities comprises a head, a centroid, a shoulder, a hip, a leg, an arm, a hand, an elbow, a knee, or a foot.

14. The computer-readable storage device of claim 10, further comprising
    processing the adjusted model.

15. The computer-readable storage device of claim 14, wherein the first voxel is generated based on a portion or block of pixels included in the received depth image.

16. A system for tracking a model associated with a user, the system comprising:
    a capture device that receives a depth image of a scene; and
    a memory bearing instructions that, upon execution by a processor, cause the system at least to:
      receive the depth image from the capture device;
      generate a first voxel of a plurality of voxels based on at least one pixel of the depth image that corresponds to a background independent of at least one pixel that corresponds to a human target, the first voxel overlapping another voxel in the plurality of voxels;
      remove the first voxel from the plurality of voxels to isolate one or more voxels associated with the human target;
      determine a location or position of one or more extremities of the human target based on the one or more voxels associated with the human target; and
      adjust a model based on the location or position of the one or more extremities.

17. The system of claim 16, wherein the first voxel is generated based on a portion or block of pixels included in the received depth image.

18. The system of claim 16, wherein the model is adjusted based on the location or position of the one or more extremities by assigning the location or position of the one or more extremities to at least one corresponding joint of the model.

19. The system of claim 16, wherein the one or more extremities comprises a head, a centroid, a shoulder, a hip, a leg, an arm, a hand, an elbow, a knee, or a foot.

20. The system of claim 16, wherein the instructions that, upon execution by the processor, cause the system at least to remove the first voxel from the plurality of voxels to isolate one or more voxels associated with the human target further cause the system at least to:

determine whether an object that is associated with the first voxel is in motion; and discard the first voxel in response to determining that the object is not in motion.

\* \* \* \* \*